United States Patent
Haislett et al.

(10) Patent No.: US 6,563,799 B1
(45) Date of Patent: May 13, 2003

(54) APPLICATION MODULE INTERFACE FOR HARDWARE CONTROL SIGNALS IN A PRIVATE BRANCH EXCHANGE (PBX) ENVIRONMENT

(75) Inventors: David W. Haislett, Freehold, NJ (US); Gregory Lese, Howell, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/240,930

(22) Filed: Jan. 29, 1999

(51) Int. Cl.[7] .............................. H04L 12/16; H04J 3/12
(52) U.S. Cl. ..................................... 370/264; 370/522
(58) Field of Search ................................ 370/264, 359, 370/419, 463, 522, 410, 524, 241, 242, 247, 510; 379/93.05, 137, 229, 230, 234, 236, 399.01, 93.14; 709/237, 236

(56) References Cited

U.S. PATENT DOCUMENTS

| | | | |
|---|---|---|---|
| 5,047,927 A | * 9/1991 | Sowell et al. ............... | 709/236 |
| 5,398,249 A | * 3/1995 | Chen et al. .................. | 370/524 |
| 5,408,522 A | * 4/1995 | Ikehata et al. ............. | 379/93.14 |
| 5,483,530 A | * 1/1996 | Davis et al. ................ | 370/524 |
| 5,764,643 A | * 6/1998 | Takebayashi et al. ....... | 370/463 |
| 5,822,328 A | * 10/1998 | Derby et al. ................ | 370/510 |
| 5,903,572 A | * 5/1999 | Wright et al. ................ | 370/463 |
| 5,956,392 A | * 9/1999 | Tanigawa et al. ........... | 379/137 |
| 5,961,600 A | * 10/1999 | Ono et al. ................... | 709/237 |
| 6,002,422 A | * 12/1999 | Mastenbrook .............. | 725/107 |

* cited by examiner

Primary Examiner—Chau Nguyen
Assistant Examiner—Andy Lee
(74) Attorney, Agent, or Firm—Ryan, Mason & Lewis, LLP

(57) ABSTRACT

An application module interface (AMI) is disclosed that allows one or more modules to access voice or data channels in a private branch exchange environment. The AMI provides a number of hardware signals to the telephone terminal and/or modules. The hardware control signals include module present, phone receiving OK and module receiving OK. The module present (MP) signal indicates that a module is plugged into the AMI electrical interface. The module receiving OK (MOD-OK) and phone receiving OK (PHONE-OK) signals indicates that the module and phone, respectively, is receiving valid AMI control channel messages. The hardware control signals permit the presence of a telephone terminal and/or a module to be detected, as well as to detect the disruption of an AMI connection. The hardware control signals are used to implement a start-up, recovery and tear-down mechanism. The disruption of the AMI connection can be detected if a telephone terminal or a module detects that its counterpart receiving OK (PHONE-OK or MOD-OK) signal has been turned off. In addition, the telephone terminal may detect that the module present (MP) signal has been turned off.

10 Claims, 13 Drawing Sheets

800

PROTOCOL LEVEL MESSAGES

| HEX | BINARY | AMI MESSAGE DESCRIPTION |
|---|---|---|
| 130 | 1:0011:0000 | LINK ACTIVITY MESSAGE (KEEP ALIVE) |
| 13E 13F | 1:0011:111S | ACKNOWLEDGMENT (ACK); BIT 0 (S) IS THE SEQUENCE NUMBER |
| 133 | 1:0011:0011 | NEGATIVE ACKNOWLEDGMENT (NACK) |
| 1C0 TO 1DF | 1:110S:nnnn | APPLICATION MESSAGE. BIT 4 IS THE SEQUENCE NUMBER BIT; BITS 0-3 ARE THE LENGTH OF THE APPLICATION MESSAGE BODY. (NOTE THAT A LENGTH OF 0 IS INVALID, BUT INCLUDED IN THE RANGE HERE.) |

APPLICATION MESSAGES FROM PHONE

| HEX | BINARY | APPLICATION MESSAGE DESCRIPTION | LENGTH |
|---|---|---|---|
| 000 | 0:0000:0000 | S1-CHANNEL LAYER 3 MESSAGE FOR TRANSMISSION TO SWITCH | 2 TO 7 |
| 002 | 0:0000:0010 | PHONE STATES MESSAGE | 5 |
| 00E | 0:0000:1110 | HDLC CONTROL CONFIRMATION | 2 |
| 090 TO 09F | 0:1001:nnnn | SOFTKEY LABEL CONTENTS. BITS 0-3 CONTAIN THE SOFTKEY BUTTON NUMBER (TYPICALLY 1 TO 12). THE REMAINDER OF THE MESSAGE IS THE SOFTKEY LABEL. | 6 |
| 0C0 TO 0DF | 0:110R:kkkk | DIAL KEY PRESS OR RELEASE. R=1 FOR RELEASE; R=0 FOR PRESS. BITS 0-3 (kkkk) IDENTIFY THE KEY (SEE TEXT). | 1 |
| 0E0 TO 0EF | 0:1110:bbbb | LOCAL BUTTON PRESS. BITS 0-3 (bbbb) IDENTIFY THE BUTTON AND POSSIBLY ITS NEW STATE. REFER TO THE TEXT FOR DETAILS. | 1 OR 2 |
| 0F0 TO 0F7 | 0:1111:0nww | AUDIO STATE CHANGE. n=1 IF THE SOURCE OF THE CHANGE (ww) IS ACTIVATING (TURNING ON OR GOING OFF-HOOK). SOURCES: ww=00 FOR HANDSET, 01 FOR SPEAKER, 10 FOR ADJUNCT, 11 FOR HEADSET JACK (IF ANY). | 2 |
| 0F8 TO 0FF | 0:1111:1S0L | LINE INTERFACE STATE CHANGE. S=1 IF LAYER 1 STATE IS ACTIVE; L=1 IF LINE INTERFACE LOOPBACK IS ACTIVE. (IGNORE L IF S=0.) | 1 |

FIG. 9

APPLICATION MESSAGES FROM MODULE

1000

| HEX | BINARY | APPLICATION MESSAGE DESCRIPTION | LENGTH |
|---|---|---|---|
| 000 | 0:0000:0000 | S1-CHANNEL LAYER 3 MESSAGE RECEIVED FROM SWITCH (OR FROM MODULE). | 2 TO 15 |
| 003 | 0:0000:0011 | PHONE STATES REQUEST | 1 |
| 005 | 0:0000:0101 | SET HDLC CONTROL | 1 |
| 009 | 0:0000:1001 | SOFTKEY LABEL QUERY | 2 |
| 00A | 0:0000:1010 | TELEPHONE CONTROL | 2 |
| 00C | 0:0000:1100 | GENERATE RECORDER BEEP | 4 |
| 00F | 0:0000:1111 | SET VOICE CHANNEL CONFIGURATIONS | 2 |
| 018 | 0:0001:1000 | MODULE STATE CHANGE | 2 |
| 0A0 TO 0A3 | 0:1010:00TT | OUTPUT LOCAL TONE. TT=00 FOR BUTTON CLICK; TT=01 FOR ERROR BEEP, TT=10 FOR CONFIRMATION TONE; TT=11 RESERVED. | 1 |

FIG. 10

BEARER CHANNEL CONFIGURATIONS

1100

| MODE | APPLICATION | DESCRIPTION |
|------|-------------|-------------|
| 0 | NORMAL WITHOUT MODULE OR WITH MODULE FOR RECORDER INTERFACE OR VOICE RECOGNITION | VOICE PATHS ARE SENT AND RECEIVED TO THE LIU. COPIES OF THE RECEIVED AND TRANSMITTED VOICE IS SENT TO THE MODULE. |
| 1 | TIP/RING MODULE ON THE B2-CHANNEL | VOICE PATHS ON B1 ARE TERMINATED IN THE MAP AND B2-CHANNELS ARE SENT AND RECEIVED TO/FROM AMI. |
| 2 | TIP/RING MODULE ON THE B1-CHANNEL | BASE VOICE PROCESSING IS SILENCED AND B1-CHANNELS TO/FROM THE PBX ARE SENT AND RECEIVED VIA AMI. |
| 3 | MULTIMEDIA MODULE | THE B1 AND B2-CHANNELS TO/FROM THE PBX ARE BOTH SENT AND RECEIVED ONLY BY THE MODULE VIA AMI. THE BASE VOICE PATHS ARE SILENCED. |
| 4 | MULTIMEDIA MODULE WITH BASE VOICE TRANSDUCERS | THE B1 AND B2-CHANNELS TO/FROM THE PBX ARE BOTH SENT AND RECEIVED ONLY BY THE MODULE VIA AMI. THE BASE VOICE TRANSDUCERS ARE SENT AND RECEIVED OVER AMI. THIS PERMITS EXTERNAL USE OF BOTH BEARER CHANNELS WHILE USING THE BASE TERMINAL AUDIO TRANSDUCERS. |

FIG. 11

APPLICATION MODULE INTERFACE FOR HARDWARE CONTROL SIGNALS IN A PRIVATE BRANCH EXCHANGE (PBX) ENVIRONMENT

FIELD OF THE INVENTION

The present invention relates generally to private branch exchange (PBX) switches, and more particularly, to a method and apparatus for allowing one or more modules to access voice or data channels on the private branch exchange.

BACKGROUND OF THE INVENTION

Within a corporate environment, telephone service is typically provided by a private branch exchange switch. A private branch exchange switch is an on-site facility, that is typically owned or leased by a company or another entity. The private branch exchange interconnects the telephones within the facility and provides access to the public telephone system. Typically, a private branch exchange environment uses digital telephone terminals and digital switching. Digital private branch exchange switches were designed to handle analog voice traffic, with the switch performing an analog-to-digital conversion (DAC) so that digital switching can be used internally on the entity premises. Increasingly, however, private branch exchanges (PBX) are carrying data traffic as well as voice traffic. Typically, data calls are generally switched through a modem-pool to the private branch exchange for transmission to the Public Switched Telephone Network (PSTN).

While a private branch exchange allows an entity to efficiently provide access to communication services without necessarily having dedicated telephone lines for each employee, the private branch exchange often limits the types of communications equipment that may be connected to the PBX and the types of services that may be accessed over the PBX. For example, since the telephone terminals connected to the PBX are digital, it is often difficult, if not impossible, to connect an analog device to the PBX. In addition, the communications protocols and hardware specifications of a given private branch exchange are often proprietary to the manufacturer of the PBX. Thus, it is often difficult, if not impossible, to connect equipment manufactured by another manufacturer to the PBX.

Adjunct processors have been proposed for use with private branch exchanges (PBXs) to supplement and enhance the telecommunications services provided by the PBX. For example, a voice mail system is often used with a PBX to provide users with voice messaging capabilities. In order to work together, the PBX and the adjunct processor must be able to communicate with each other. This is typically accomplished by means of a digital control data link, such as the DCIU link, commercially available from AT&T, that interconnects the PBX control processor with the adjunct processor.

In addition, other interfaces have been proposed or suggested that allow other types of equipment to be connected to a private branch exchange. For example, the 8411 terminal, commercially available from Lucent Technologies Inc., of Murray Hill, N.J., provides a tip/ring interface that allows analog devices to be connected to the private branch exchange and an RS-232 (passageway) interface that allows a computer to be connected to the PBX and permits Computer Telephone Integration (CTI). These other interfaces, however, including the 8411 terminal, are typically designed specifically to provide specific features and to operate with the particular communications protocol and/or hardware specification of a given private branch exchange manufacturer, or telephone terminal manufacturer. Current interfaces are unable to support additional features that may be desired by a customer.

As apparent from the above-described deficiencies with conventional techniques for connecting devices to a private branch exchange switch, a need exists for a standard interface to the private branch exchange that allows one or more modules to access voice or data channels on the private branch exchange. A further need exists for an interface to the private branch exchange that utilizes an integrated digital telephone chip. Yet another need exists for an interface to the private branch exchange that permits a module to support additional features for the private branch exchange.

SUMMARY OF THE INVENTION

Generally, an application module interface is disclosed that allows one or more modules to access voice or data channels in a private branch exchange environment. In addition, the application module interface provides a number of hardware signals to the telephone terminal and/or modules. The hardware control signals include module present, phone receiving OK and module receiving OK. The module present (MP) signal indicates that a module is plugged into the AMI electrical interface, although the module may not be powered. The module receiving OK (MOD-OK) signal indicates that the module is receiving valid AMI control channel messages. The phone receiving OK (PHONE-OK) signal indicates that the telephone terminal is receiving valid AMI control channel messages.

According to one aspect of the invention, the hardware control signals permit the presence of a telephone terminal and/or a module to be detected, as well as to detect the disruption of an AMI connection. An AMI connection may be disrupted, for example, due to a device losing power, being disconnected or a transient event that corrupts the data stream and causes a loss of synchronization.

According to a further aspect of the invention, the hardware control signals are used to implement a start-up and tear-down mechanism. The module enables its application module interface receiver (AMR) about 30 milliseconds after the module begins the AMI start-up process. The application module interface receiver of the module will not be receiving valid data until the telephone terminal enables its application module interface transmitter (AMX). Thus, the module ignores data errors during this phase of the AMI start-up and only start counting errors after a valid message has been received.

During the initial start-up, the application module interface receiver and the application module interface transmitter of the application module interface in the telephone terminal are off. In addition, the PHONE-OK signal is set to false. Once the phone recognizes that the module present (MP) signal is active, the phone will set the data fields in the application module interface transmitter to zeroes for at least 10 milliseconds, allowing the application module interface receiver of the module to synchronize to the received AMI start bits. After the end of the ten millisecond interval is detected, the phone will begin sending a control channel activity message, once every ten milliseconds.

Meanwhile, when the module receives the first AMI control channel activity message from the telephone terminal, the module will assert its module receiving OK (MOD-OK) signal and enable its application module interface transmitter. The application module interface transmitter of the module is configured to output zeroes in all B and D data fields and no control channel data is sent so that the only ones output are start bits. Thus, the telephone terminal can synchronize to the AMI start bits. The module will then wait until the module receives five link activity messages from the telephone terminal, before the module starts sending its own link activity message at ten milliseconds intervals. In this manner, the telephone terminal can detect the module receiving OK (MOD-OK) signal and enable its application module interface receiver while only start bits are being sent. Forty milliseconds will elapse between the five messages and the telephone terminal needs up to 30 milliseconds to detect the MOD-OK signal and enable its application module interface receiver. Thus, there is a 10 millisecond interval before the module sends its first message.

The telephone terminal detects the MOD-OK signal and enables its application module interface receiver. The telephone terminal continues sending link activity messages every 10 milliseconds. The module starts sending link activity messages every 10 milliseconds after receiving the fifth link activity message from the telephone terminal.

When the telephone terminal detects the receipt of the first link activity message from the module, the telephone terminal will assert the phone receiving OK (PHONE-OK) signal. The PHONE-OK signal indicates that the AMI connection is established and normal message activity may commence. Thus, the telephone terminal reduces the rate of the activity messages to one per 100 milliseconds. In addition, the telephone terminal puts received D channel HDLC data onto its application module interface transmitter (AMX-D=LIUrx-D), and the telephone terminal will allow B channel data onto the application module interface transmitter. It is noted that all AMX-B* data will be zeroes until the module sends a set voice channel configuration message When the module detects the PHONE-OK signal, the module should reduce its activity message rate to one per 100 milliseconds, and the module may send a phone states request to obtain phone state information. Until the PHONE-OK signal is asserted by the telephone terminal, only activity messages can be sent and no B or D channel data is allowed onto the application module interface.

If the telephone terminal fails to detect the MOD-OK signal and receive an activity message from the module within 500 milliseconds of detecting the module present (MP) signal, the telephone terminal will disable its AMI transceiver and begin the start-up process over again. The start-up process should take at most 110 milliseconds, with 30 milliseconds allocated for detecting the module present (MP) signal, 50 milliseconds allocated for detecting five activity messages from the telephone terminal (during which time MOD-OK should be detected), and 30 milliseconds allocated for detecting the PHONE-OK signal.

The module waits up to one second from initialization to detect that the PHONE-OK signal has been asserted by the telephone terminal. If the one second time interval expires, the module should reset its AMI transceiver, turn off the MOD-OK signal, and begin the start-up process over again after a delay of at least 30 milliseconds.

Once the AMI connection has been established in accordance with the start-up process, the AMI connection may be disrupted, for example, due to a module losing power, being disconnected or a transient event that corrupts the data stream and causes a loss of synchronization. A disruption of the AMI connection may be detected using the hardware signals and the control channel protocol. If a disruption is detected, the detecting telephone terminal or module immediately turns off its receiving OK (PHONE-OK or MOD-OK) signal and disables its AMI transceiver. The detecting telephone terminal or module should then wait at least 30 milliseconds before attempting to restart the AMI.

According to an aspect of the invention, a number of mechanisms detect the disruption of the AMI connection. A telephone terminal or a module may detect that its counterpart receiving OK (PHONE-OK or MOD-OK) signal has been turned off. In addition, the telephone terminal may detect that the module present (MP) signal has been turned off.

A more complete understanding of the present invention, as well as further features and advantages of the present invention, will be obtained by reference to the following detailed description and drawings.

BRIEF DESCRIPTION OF THE DRAWINGS

FIG. 8 illustrates a set of representative protocol control messages in accordance with the present invention;

FIG. 9 illustrates a set of representative application messages that are sent by the telephone terminal of FIG. 1;

FIG. 10 illustrates a set of representative application messages that are sent by the module of FIG. 1;

FIG. 11 summarizes a number of configurations of the voice and bearer channels, B1 and B2, of FIG. 3;

DETAILED DESCRIPTION

Figure 1:
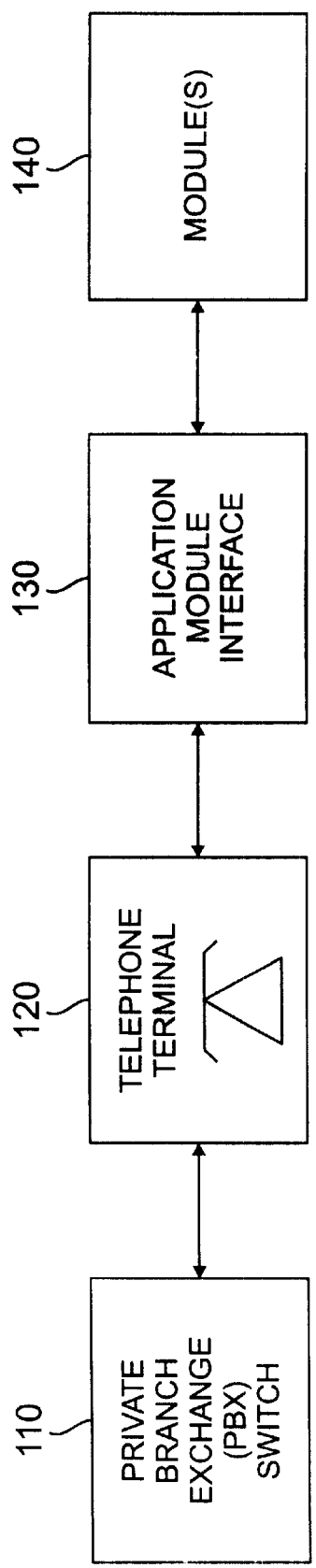
FIG. 1 illustrates a private branch exchange environment that includes an application module interface in accordance with the present invention.

FIG. 1 illustrates a private branch exchange switch 110 connected to a telephone terminal 120. According to a feature of the present invention, the telephone terminal 120 is connected to (or provides) an application module interface 130, discussed further below, that allows one or more modules 140 to access voice or data channels. For example, one illustrative implementation of the module 140 allows an analog device, such as a facsimile machine (not shown) or modem (not shown), to access the digital channels associated with the private branch exchange switch 110. In addition, the application module interface provides a control channel, discussed below, that permits a module to obtain and vary the status and configuration of a telephone terminal.

It is noted that the application module interface 130 may be embodied as a separate unit independent of the telephone terminal 120, as shown in FIG. 1, or may be integrated with the telephone terminal 120, in a manner discussed below. The telephone terminal 120 may be embodied, for example, as a ProLogix™ terminal 6416 or 6424, commercially available from Lucent Technologies, Inc. of Murray Hill, N.J. In addition, the telephone terminal 120 can be embodied as one or more of a handset, a loudspeaker and a headset.

Typically, a private branch exchange switch 110, such as a Definity™ PBX or a Merlin Legend™ PBX, commercially available from Lucent Technologies, Inc. of Murray Hill, N.J., contains two B channels (bearer channels), for transmitting voice or data signals, and one D channel (signaling channel) for transmitting data. It is noted that the D channel is sometimes referred to as the "S" channel.

According to a feature of the present invention, the application module interface 130 provides access to both directions of the two B channels (B1 and B2) and the one D channel. In addition, in accordance with a further feature of the invention, the application module interface 130 provides a local control channel, C, for communicating with the application module(s) 140 connected to a telephone terminal 120. The particular frame format used by the application module interface 130 is discussed below in conjunction with FIG. 3. A representative control channel format used by the application module interface is discussed below in conjunction with FIG. 4.

Although the application module interface 130 is physically located after the telephone terminal 120, as shown in FIG. 1, the application module interface 130 has a logical position ("linked position") between the telephone terminal 120 and the private branch exchange 110. In other words, signals can initially by-pass the telephone terminal 120 and can be processed by a module 140 via the application module interface 130. Thus, as discussed further below, in various embodiments, the application module interface 130 can monitor, use, alter, supply or simply pass through any of the two B channels (B1 and B2) or one D channel (signaling channel) to the telephone terminal 120.

According to another feature of the invention, the application module interface 130 is the only interface required for connecting the control, C, and two B channels (B1 and B2) and the one D channel to or from the telephone terminal 120 and the add-on module 140. In addition, the application module interface 130 provides a number of hardware connections to the telephone terminal 120 and/or modules 140, discussed in conjunction with FIG. 5, that permit the presence of a telephone terminal 120 and/or a module 140 to be detected, as well as to detect the disruption of an AMI connection, for example, due to a device losing power, or a transient event that corrupts the data stream and causes a loss of synchronization.

INTEGRATED TELEPHONE CHIP IMPLENTATION

Figure 2:
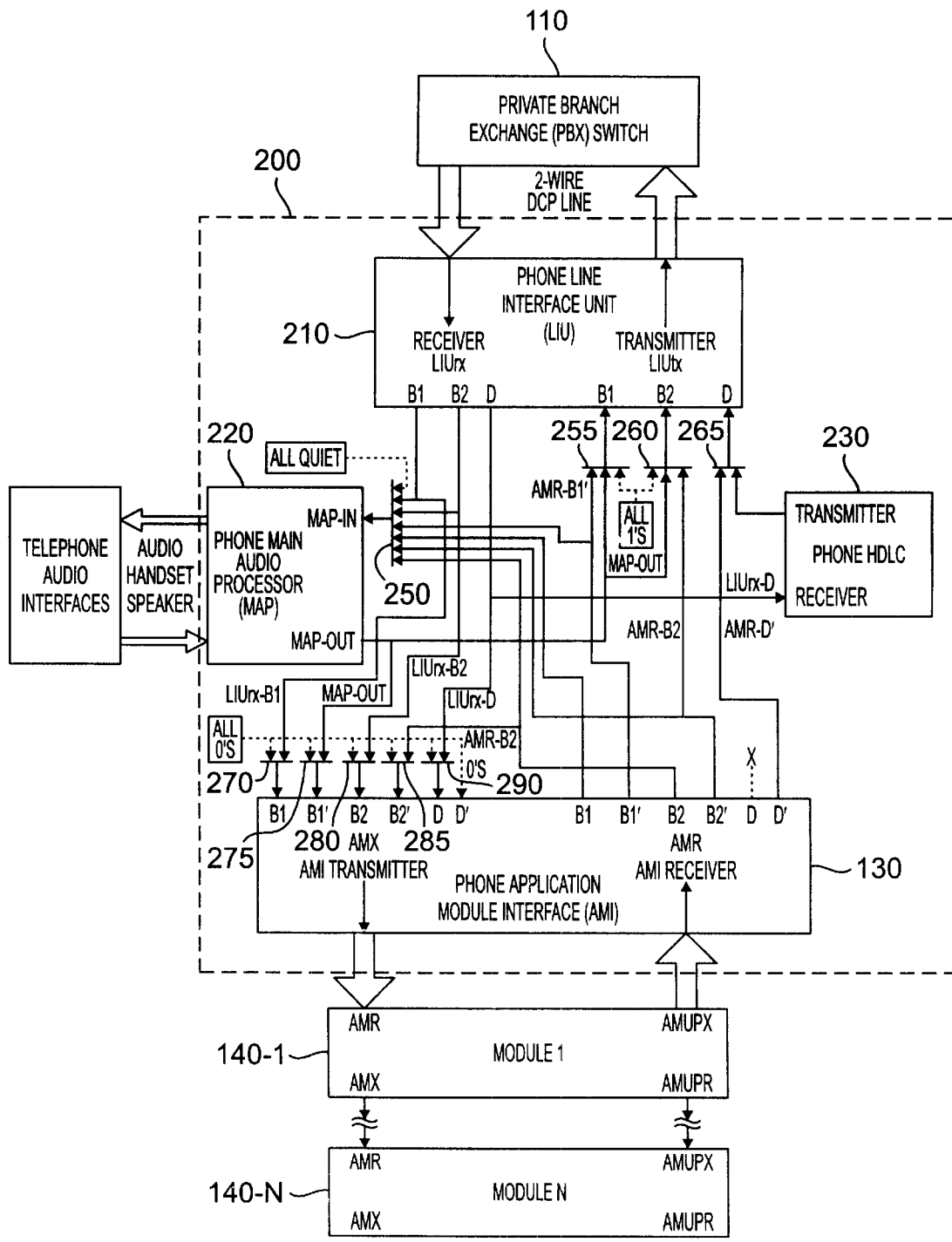
FIG. 2 illustrates the private branch exchange environment of FIG. 1 that utilizes an integrated digital telephone chip to provide the application module interface of FIG. 1.

According to one feature of the present invention, the application module interface 130 may be implemented as part of an integrated digital telephone chip 200, shown in FIG. 2. The integrated digital telephone chip 200 may be embodied, for example, as the Global Digital Telephone (GDT) chip (part T7951), commercially available from Lucent Technologies, Inc. of Murray Hill, N.J., as modified herein to implement the features and functions of the present invention. As discussed further below, each of the telephone terminals 120 and the modules 140 may be based on the same integrated digital telephone chip 200.

As shown in FIG. 2, in addition to the application module interface 130, the integrated digital telephone chip 200 includes one or more line interface unit(s) 210, a main audio processor (MAP) 220 and a well-known high-level data link controller (HDLC) 230. For a detailed discussion of a suitable line interface unit(s) (LIU) 210, see, for example, Siemens Semiconductor, Component No. PEB2095 (ISDN Burst Tranceiver Circuit) data sheet (June 1992), incorporated by reference herein, as modified herein to provide features of the present invention. For a detailed discussion of a suitable main audio processor 220, see, for example, Advanced MicroDevices, Component No. Am79C30A (Digital Subscriber Controller) data sheet (March 1989), incorporated by reference herein, as modified herein to provide features of the present invention.

Generally, the line interface unit(s) 210 support the two B channels (B1 and B2) and one D channel. Generally, the main audio processor 220 performs the digital-to-analog (DAC) and analog-to-digital (ADC) conversions of the audio signals. The main audio processor 220 performs CODEC functions (2 receive paths and 1 transmit path) and filter functions using digital signal processing (DSP) techniques to provide substantial flexibility and programmability. In one implementation, the main audio processor 220 provides three interfaces, namely, a handset interface, an internal speakerphone interface and a headset interface. A tone ringer output is provided to give a ringing signal independent of the operation of the voice signals. A dual-tone multi-frequency (DTMF) generator can be used to generate a signal consisting of two tones, where the frequency and amplitude of each tone is programmable.

Generally, the high-level data link controller 230 is used for the "D" channel. The high-level data link controller 230 provides HDLC framing, CRC generation and checking, zero insertion/deletion, and either flag or mark idling.

In the embodiment shown in FIG. 2, the data for the high-level data link controller 230 comes from the D channel of the line interface unit 210. In an alternate implementation (not shown), the data for the high-level data link controller 230 can come from the D channel of the application module interface receiver of the application module interface 130. In either case, the data will be provided at the nominal 16 kilo-bits-per-second rate, but a control bit in the HDLC control register (not shown) is used to determine whether to use all bits or just every other bit (to support an 8 kilo-bits-per-second D channel).

In the embodiment shown in FIG. 2, the data for the D channel of the transmitter of the line interface unit 210 is selected by a multiplexer 265 from the transmitter of the high-level data link controller 230 or from the D' channel of the application module interface receiver of the application module interface 130. In an alternate implementation (not shown), the data for the D channel of the transmitter of the line interface unit 210 can be set to all one's.

Likewise, the data for the B1 channel of the transmitter of the line interface unit 210 is selected by a multiplexer 255 from (i) the output of the main audio processor 220 (MAP- OUT), (ii) the B1' channel of the application module interface receiver of the application module interface 130, or (iii) can be set to all one's. In an alternate implementation (not shown), the data for the B1 channel of the transmitter of the line interface unit 210 can be obtained from the B1 channel of a peripheral port input (not shown). It is noted that the peripheral port is a synchronous interface that connects an external codec or an HDLC controller to the integrated digital telephone chip 200.

Similarly, the data for the B2 channel of the transmitter of the line interface unit 210 is selected by a multiplexer 260 from (i) the output of the main audio processor 220 (MAP-OUT), (ii) the B2' channel of the application module interface receiver of the application module interface 130, or (iii) can be set to all one's. In an alternate implementation (not shown), the data for the B2 channel of the transmitter of the line interface unit 210 can be obtained from the B2 channel of the peripheral port input (not shown).

As shown in FIG. 2, the data for the input to the main audio processor 220 (MAP-in) is selected by a multiplexer 250 from (i) the B1 or B2 channels of the receiver of the line interface unit 210, (ii) the B1, B1', B2 or B2' channels of the application module interface receiver of the application module interface 130, or (iii) an "all quiet" signal.

The application module interface transmitter of the application module interface 130, shown in FIG. 2, uses a set of multiplexers 270, 275, 280, 285 and 290 to select data for each of the six AMI data slots (D, D1', B1, B1', B2, B2'). As shown in FIG. 2, the data for the D channel of the application module interface transmitter is selected from (i) the D channel of the line interface unit 210, or (ii) can be set to all zeroes. Alternatively, the D channel of the application module interface transmitter can also be selected from (i) the D channel of the application module interface receiver, or (ii) the transmitter of the high-level data link controller 230. The D' channel of the application module interface transmitter is generally set to all zeroes. Alternatively, the D' channel of the application module interface transmitter can also be selected from (i) the D' channel of the application module interface receiver, or (ii) the transmitter of the high-level data link controller 230.

The data for the B1 channel of the application module interface transmitter is selected from (i) the B1 channel of the line interface unit 210, or (ii) can be set to all zeroes. Alternatively, the B1 channel of the application module interface transmitter can also be selected from (i) the B1 or B1' channel of the application module interface receiver, (ii) the output of the main audio processor 220; (ii) the B1 channel of a digital signal processor (not shown), or (iv) the B1 channel of the peripheral port input (not shown).

It is noted that the digital signal processor port provides a means to connect a common digital signal processor chip, such as an 8051-type microcontroller, to the integrated digital telephone chip 200 to supplement the processing capability of the main audio processor 220. The digital signal processor port can be connected either with the main audio processor 220 or with the application module interface 130. In addition, the module 140 can be connected to the digital signal processor as well.

Likewise, the data for the B1' channel of the application module interface transmitter is selected from (i) the output of the main audio processor 220 (MAP-out), or (ii) can be set to all zeroes. Alternatively, the B1 channel of the application module interface transmitter can also be selected from (i) the B1 or B1' channel of the application module interface receiver, (ii) the B1 channel of the line interface unit 210; (iii) the B1' channel of a digital signal processor (not shown), or (iv) the B1 channel of the peripheral port input (not shown).

The data for the B2 channel of the application module interface transmitter is selected from (i) the B2 channel of the line interface unit 210, or (ii) can be set to all zeroes. Alternatively, the B2 channel of the application module interface transmitter can also be selected from (i) the B2 or B2' channel of the application module interface receiver, (ii) the output of the main audio processor 220; (iii) the B2 channel of a digital signal processor (not shown), or (iv) the B2 channel of the peripheral port input (not shown).

Likewise, the data for the B2' channel of the application module interface transmitter is selected from (i) the B2 channel of the application module interface receiver, or (ii) can be set to all zeroes. Alternatively, the B2' channel of the application module interface transmitter can also be selected from (i) the B2' channel of the application module interface receiver, (ii) the B2 channel of the line interface unit 210; (iii) the B2' channel of a digital signal processor (not shown), (iv) the B2 channel of the peripheral port input (not shown), or (v) the output of the main audio processor 220 (MAP-out).

INTER-MODULE COMMUNICATIONS

B and D Channel Data

When there are multiple application modules, as shown in FIG. 2, data from the two B channels (B1 and B2) or the one D channel flows downstream from the telephone terminal 120 (the receiver of the LIU 210) and through each application module 140-1 through 140-N in series. Along the downstream path, the data is changed as needed. The last module 140-N in the series chain sends its AMI output back upstream, again passing through each intervening module 140-N-1 through 140-1, without modification.

As shown in FIG. 2, the integrated digital telephone chip 200 provides two receivers, referred to as an application module interface receiver and an application module upstream receiver (AMUPR), and two transmitters, referred to as an application module interface transmitter and an application module upstream transmitter. The application module interface transmitter is the primary output for "downstream" communications with the application module interface 130 and the module(s) 140-1 through 140-N. In other words, the application module 10 interface transmitter is the one transmitter used on terminals, and as the downstream interface on modules 140. Data from the two B channels (B1 and B2) or the one D channel can be directed from a functional block of the integrated digital telephone chip 200 to the application module interface transmitter.

As shown in FIG. 2, the application module interface 130 and each module 140 includes an application module upstream transmitter (AMUPX). The application module upstream transmitter is the secondary output for the application module interface 130 for upstream communications from the chained modules 140-1 through 140-N to the telephone terminal 120. The application module upstream transmitter is not used on a telephone terminal 120.

The application module interface receiver is the primary input for "upstream" communications between the application module interface 130 and the module(s) 140-1 through 140-N. In other words, the application module interface receiver is the one receiver used on terminals, and as the downstream interface on modules 140. Data from the two B channels (B1 and B2) or the one D channel can be received by the application module interface receiver from a module 140 and directed to a functional block of the integrated digital telephone chip 200.

As shown in FIG. 2, the application module interface 130 and each module 140 includes an application module upstream receiver. The application module upstream receiver is the secondary input for the application module interface 130. The application module upstream receiver is used in application modules 140 to receive "upstream" AMI data from modules 140-1 through 140-N that are further "downstream." Data from the two B channels (B1 and B2) or the one D channel that is received by an application module upstream receiver can only be passed out on the application module upstream transmitter unchanged The application module upstream receiver is not used on a telephone terminal 120. For the last application module 140-N in the series chain, there will be no valid data on the application module upstream receiver. In this case, the last application module 140-N must initiate upstream B and D channel data flow by outputting the B and D data on its application module upstream transmitter.

Thus, there are two operating modes for the application module upstream transmitter. In a first mode, referred to as the "pass-through mode," the application module upstream transmitter transmits B and D data from the application module upstream receiver. The pass-through mode is used by modules 140 in the middle of the series chain. In this case, timing for the application module upstream transmitter is based on the application module upstream receiver. There is a one bit time delay between frames (and data) received on the application module upstream receiver and the output on application module upstream transmitter.

In a second mode, referred to as the "turn-around mode," the application module upstream transmitter transmits B and D data from application module interface transmitter sources. The application module upstream transmitter is used by the last application module 140-N in the series chain. Here, timing for the application module upstream transmitter is the main 8 kilo-hertz (KHz) frame timing of the integrated digital telephone chip 200, as discussed below.

Although a telephone terminal 120 is always the most upstream device, the telephone terminal 120 only uses application module interface receiver and application module interface transmitter pins, rather than application module upstream receiver and application module interface transmitter pins. Thus, while a telephone terminal 120 really only looks downstream, to the integrated digital telephone chip 200, the telephone terminal 120 appears as follows. The telephone terminal 120 transmits control channel data downstream on the application module interface transmitter. The telephone terminal 120 receives control channel data from upstream on the application module interface receiver (which is really from downstream). The telephone terminal 120 will thus enable its downstream control channel transmitted (AMX) and its upstream control channel receiver (AMR). It is noted that telephone terminals 120 must use the application module interface receiver, because B and D data from the application module upstream receiver can only be passed on to the application module upstream transmitter.

Control Channel Data

Control channel communications between the application module interface 130 and the application modules 140-1 through 140-N utilize a point to point connection. The telephone terminal 120 sends control channel data to the first module 140-1, and receives control channel data generated by the first module 140-1. The first module 140-1, in turn, in addition to sending and receiving control channel communications with the telephone terminal 120, also sends control channel data to the second module 140-2, and receives control data from the second module 140-2. The contents of the control channel on the application module upstream transmitter is always the upstream control channel. Only the B and D data gets "turned around" in the manner described above for the "turn-around mode." In addition, while the application module upstream transmitter is in the "turn-around mode," the application module upstream receiver can still be used to receive control channel information from downstream modules. In this manner, a newly added downstream module 140 can be detected.

AMI FRAME CONTENTS

Figure 3:
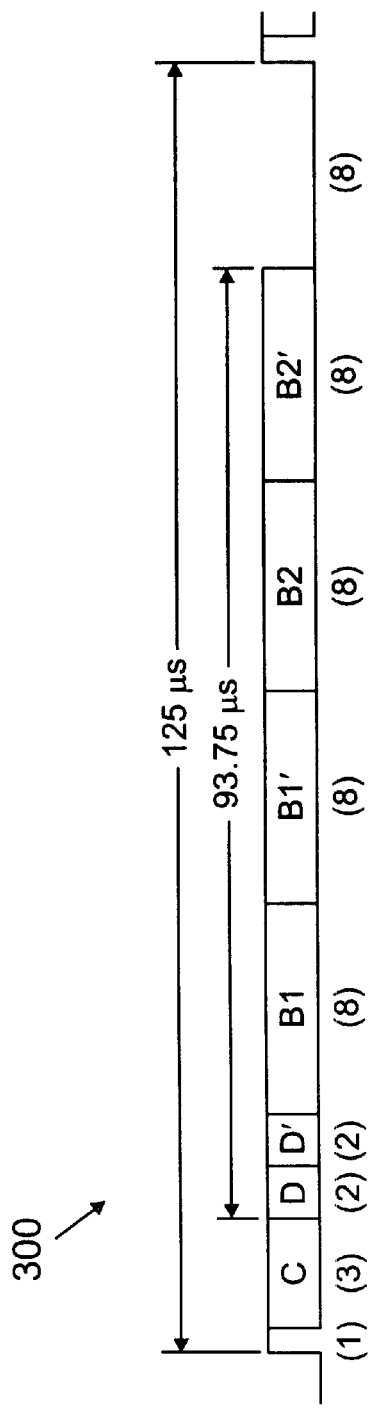
FIG. 3 illustrates a representative format of a data frame used by the application module interface of FIG. 1.

FIG. 3 illustrates an illustrative format of a start/stop data frame 300 used by the application module interface 130. As shown in FIG. 3, each 125 micro-second frame contains one start bit (logic "1"), three control channel bits, C, and 36 total data bits allocated to two D channels (D, D'), four B channels (B1, B1', B2, B2') and eight stop bits (logic "0"). Thus, there are two D channels (D, D') for transmitting the D data in both directions. The two D bits typically contain the received D channel from the line interface unit 210. The two D' bits typically contain the transmit D channel destined for the line interface unit 210.

The eight B1 bits typically contain the received B1 channel from the line interface unit 210 (voice or data). The eight B1' bits typically contain transmit voice or data signal destined for the line interface unit 210 B1 channel. The eight B2 bits typically contain the received B2 channel from the line interface unit 210 (voice or data). The eight B2' bits typically contain transmit voice or data signal destined for the line interface unit 210 B2 channel.

In the illustrative implementation, the data rate is 384 kilo-bits-per-second (Kbps), which makes the bit width 2.604 micro-seconds. AMI received data is sampled in the middle of each bit time. For each received frame 300, the bit timing is resynchronized to the received start bit.

As shown in FIG. 3, each frame is 125 microseconds (8 KHz). The 8 KHz frame timing can be derived from the active line interface unit 210, the received application module interface receiver signal, or an internal oscillator. In one implementation, the clock source is selected under software control from the external microprocessor. In normal operation, the telephone terminal 120 recovers the 8 KHz timing from the line interface unit 210, and the modules 140 recover the 8 KHz timing from their received application module interface receiver signal. Once AMX or AMUPX communications begin outputting a frame, the output continues through all of the data fields and at least five stop bits. Any change or shift in the 8 KHz timing results in the application module interface transmitter omitting one to three stop bits or outputting extra stop bits. The application module interface transmitter or application module upstream transmitter will not start outputting a new frame in the middle of a current frame, which would make start bit detection unreliable. This applies both when the 8 KHz timing source is changed, for example, by software, and when the 8 KHz source itself (from the line interface unit 210 or application module interface receiver) slips. In addition, when the application module interface transmitter or application module upstream transmitter is first enabled, zeroes will be output until the 8 KHz frame time is reached. The AMI frame output then begins with a start bit, up to 125 microseconds after being enabled.

AMI CONTROL CHANNEL

As previously indicated, the AMI frame 300 (FIG. 3) includes three "C" bits for the control channel. The control channel field actually contains one flag bit and two data bits. A complete control channel data word is split over five consecutive AMI frames and contains a total of nine data bits and a parity bit, transmitted least significant data bit first. The parity bit creates "even parity" for the ten total bits, and is generated by the integrated digital telephone chip 200. The first of the three "C" bits is the flag bit. The flag bit is set to one to indicate the start of a new control channel word, or zero otherwise.

Figure 4:
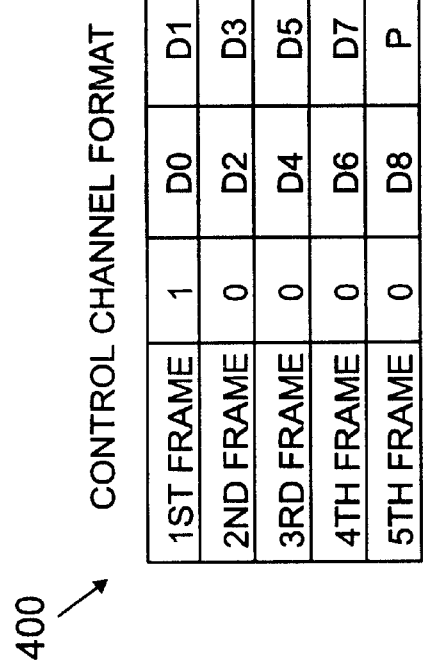
FIG. 4 illustrates a representative control channel format, where bits are sent in order from left to right, used by the application module interface of FIG. 1.

FIG. 4 illustrates a representative control channel format 400, where bits are sent in order from left to right. Thus, each control channel word requires five frames (625 microseconds). When there is no control channel data to send, all three "C" bits are set to zeroes.

An "invalid data" error is detected by a control channel receiver when the flag bit contains a one in two or more out of five consecutive frames. If an "invalid data" condition is detected, the control channel receiver flags the error and takes the newest one flag to be the start of a control channel word.

CONTROL CHANNEL PROTOCOL

According to a further feature of the present invention, a start-up and tear-down mechanism is implemented using three hardware control signals. As previously indicated, the application module interface 130 does not utilize a separate frame synchronization in the illustrative embodiment. Thus, the start-up mechanism allows detection of a start bit. If an application module interface receiver is first enabled when AMI data is present, the application module interface receiver may mistakenly process a data bit as a start bit, and get out of synchronization, thereby invalidating all data. Thus, a cautious AMI start-up mechanism is needed. Likewise, should data get out of synchronization later, recovery must be fairly rapid to avoid significant loss of D-channel messages and corruption of voice signals.

Figure 5:
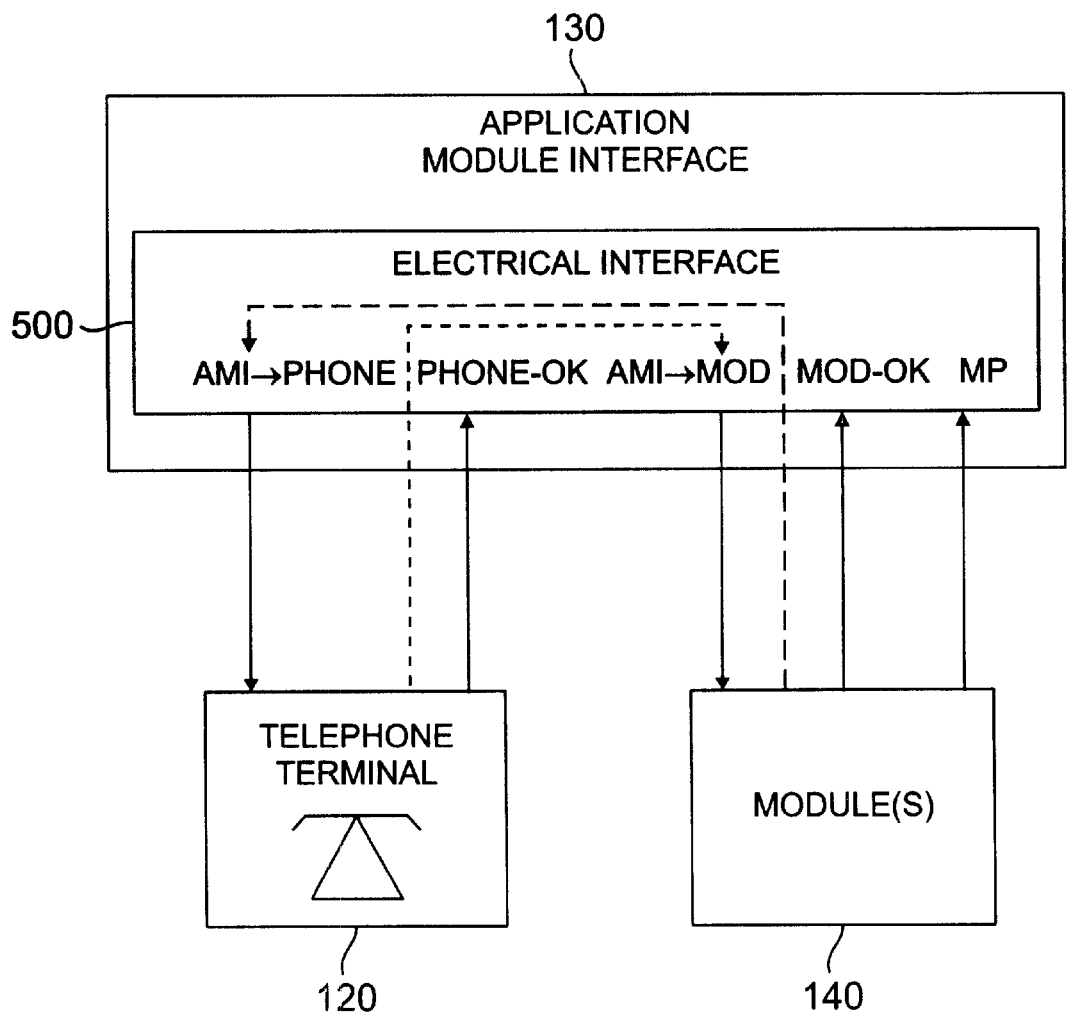
FIG. 5 illustrates the electrical interface of the application module interface of FIG. 1.

FIG. 5 illustrates the AMI electrical interface 500. As shown in FIG. 5, the AMI electrical interface 500 includes a module present (MP) signal that indicates that a module 140 is plugged into the AMI electrical interface 500. It is noted, however, that the module 140 may not be powered. In addition, the AMI electrical interface 500 includes a module receiving OK (MOD-OK) signal indicating that the module 140 is receiving valid AMI control channel messages. This signal is output from the module 140 and is active low in the illustrative embodiment.

The AMI electrical interface 500 also includes a phone receiving OK (PHONE-OK) signal indicating that the telephone terminal 120 is receiving valid AMI control channel messages. This signal is output from the telephone terminal 120 and is active low in the illustrative embodiment. An AMI to module (AMI→MOD) signal is the actual bitstream from the telephone terminal 120 to the module 140. An AMI to phone (AMI→PHONE) signal is the actual AMI bitstream from the module 140 to the telephone terminal 120. As discussed further below, the MP, MOD-OK and PHONE-OK signals form a hardware level handshake between the telephone terminal 120 and module 140 for AMI start-up and recovery, in accordance with the present invention.

AMI Start-Up

Figure 6:
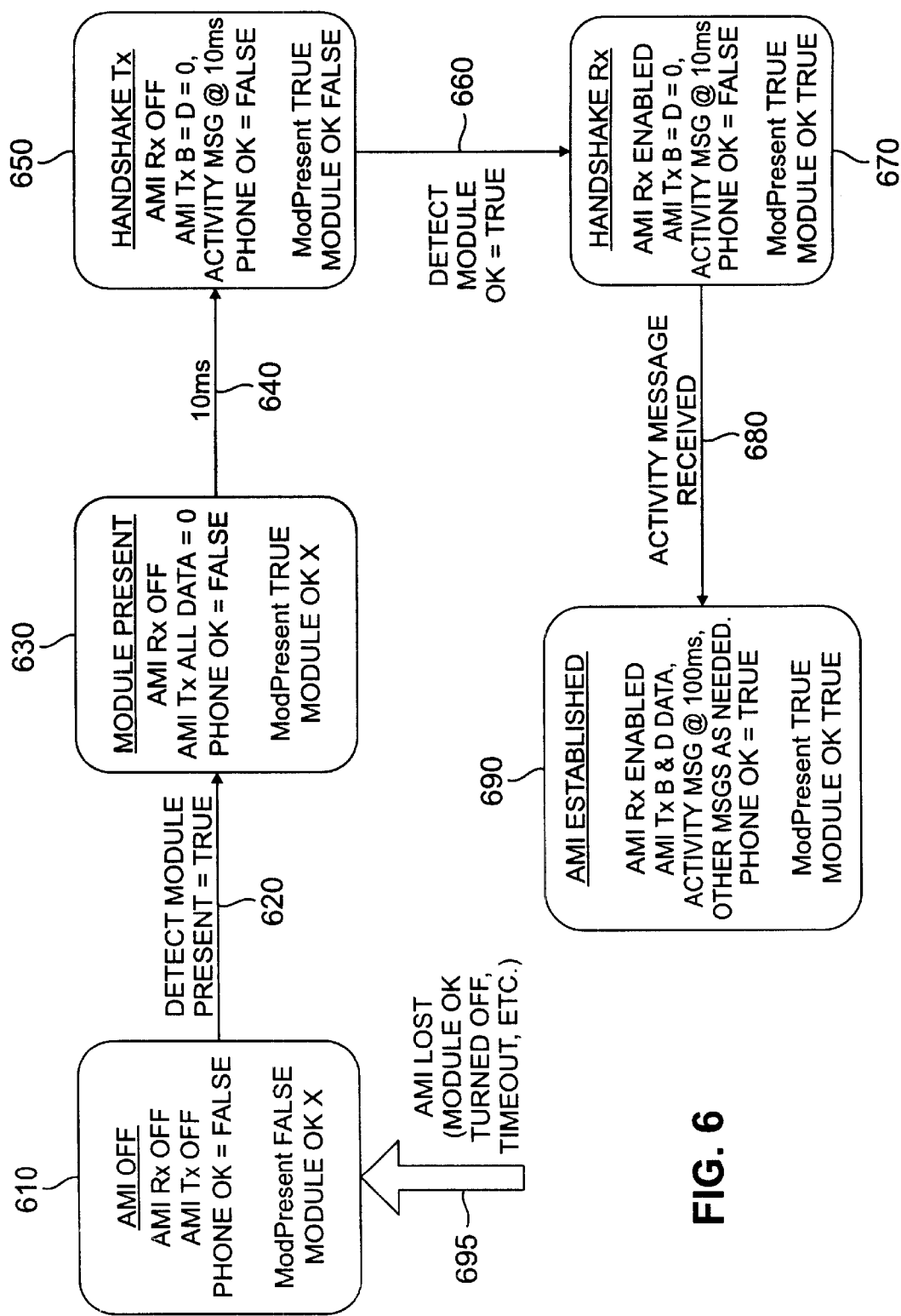
FIG. 6 illustrates the AMI start-up procedure from the point of view of the telephone terminal of FIG. 1.
Figure 7:
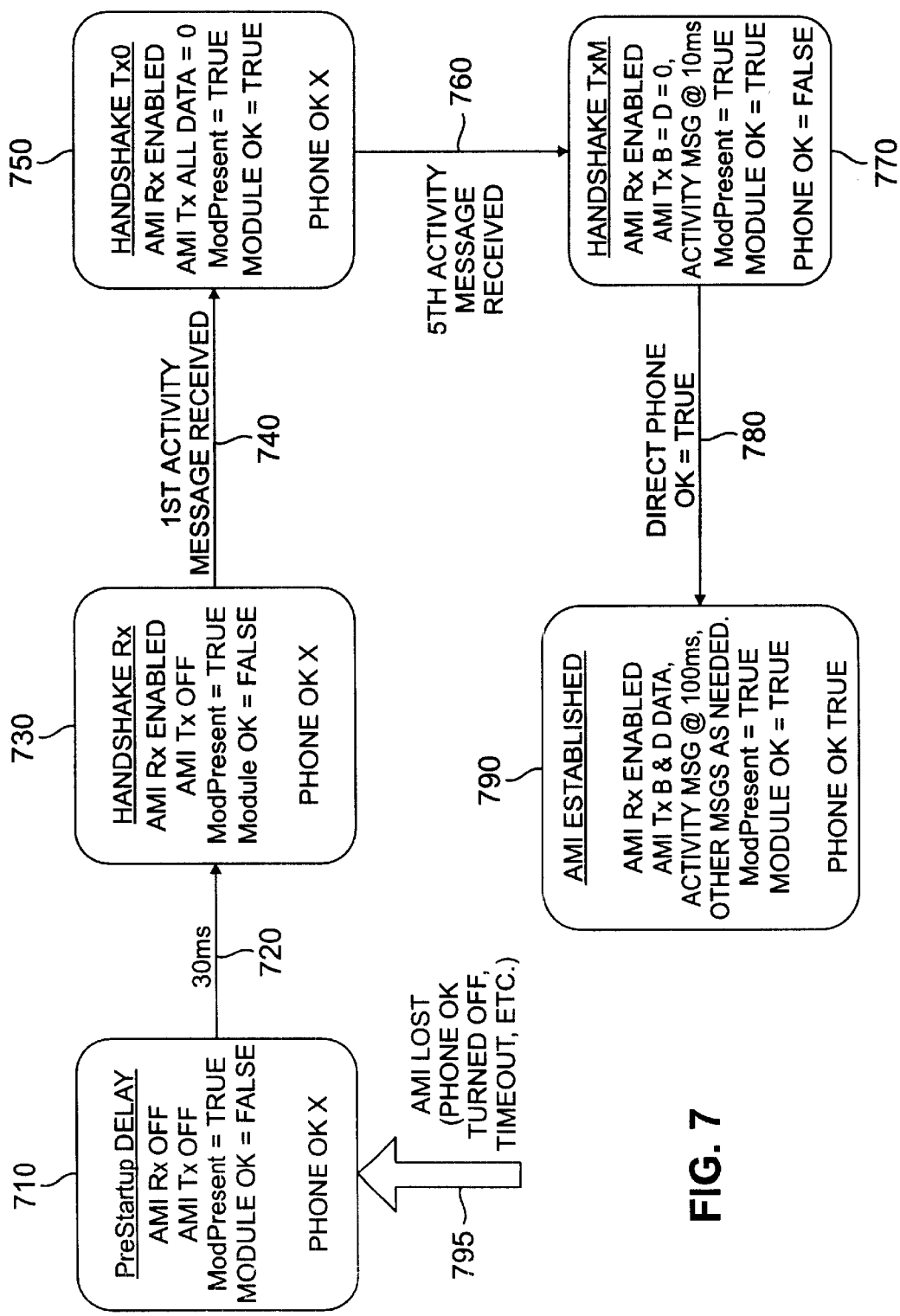
FIG. 7 illustrates the AMI start-up procedure from the point of view of a module of FIG. 1.

FIGS. 6 and 7 illustrate the AMI start-up procedure from the point of view of the telephone terminal 120 and a module 140, respectively. It is noted that the telephone terminal 120 initializes with its application module interface receiver and application module interface transmitter disabled. The application module interface transmitter is high impedance. The module 140 enables its application module interface receiver about 30 milliseconds after the module 140 begins the AMI start-up process. The application module interface receiver of the module 140 will not be receiving valid data until the telephone terminal 120 enables its application module interface transmitter. Thus, the module 140 should ignore data errors during this phase of the AMI start-up and only start counting errors after a valid message has been received.

As shown in FIG. 6, during the initial start-up condition 610, the application module interface receiver and the application module interface transmitter of the application module interface 130 in the telephone terminal 120 are off. In addition, the PHONE-OK signal (FIG. 5) is set to false. Once the phone recognizes that the module present (MP) signal (FIG. 5) is active at stage 620, the phone will set the data fields in the application module interface transmitter to zeroes at stage 630 for at least 10 milliseconds, allowing the application module interface receiver of the module to synchronize to the received AMI start bits. After the end of the ten millisecond interval is detected at stage 640, the phone will begin sending a control channel activity message, discussed below, once every ten milliseconds during stage 650.

Meanwhile, as shown in FIG. 7, when the module receives the first AMI control channel activity message from the telephone terminal 120, as detected at stage 740, the module 140 will assert its module receiving OK (MOD-OK) signal (FIG. 5) and enable its application module interface transmitter during step 750. The application module interface transmitter (AMUPX) of the module 140 is configured to output zeroes in all B and D data fields and no control channel data is sent so that the only ones output are start bits. Thus, the telephone terminal 120 can synchronize to the AMI start bits. The module 140 will then wait until the module 140 receives five link activity messages from the telephone terminal 120, as detected during stage 760, before the module 140 starts sending its own link activity message during stage 770 at ten milliseconds intervals. In this manner, the telephone terminal 120 can detect the module receiving OK (MOD-OK) signal and enable its application module interface receiver (at stage 670) while only start bits are being sent. It is noted that 40 milliseconds will elapse between the five messages and the telephone terminal 120 needs up to 30 milliseconds to detect the MOD-OK signal and enable its application module interface receiver. Thus, there is a 10 millisecond interval before the module 140 sends its first message.

As shown in FIG. 6, the telephone terminal 120 detects the MOD-OK signal during stage 660 and enables its application module interface receiver. The telephone terminal 120 continues sending link activity messages every 10 milliseconds during stage 670. As previously indicated, the module 140 starts sending link activity messages every 10 milliseconds during stage 770 after receiving the fifth link activity message from the telephone terminal 120.

When the telephone terminal 120 detects the receipt of the first link activity message from the module during stage 680, the telephone terminal 120 will assert the phone receiving OK (PHONE-OK) signal (FIG. 5) during stage 690. The PHONE-OK signal indicates that the AMI connection is established and normal message activity may commence, as discussed below in the subsection entitled "Protocol." Thus, during stage 690, the telephone terminal 120 reduces the rate of the activity messages to one per 100 milliseconds. In addition, the telephone terminal 120 puts received D channel HDLC data onto its application module interface transmitter (AMX-D=LIUrx-D), and the telephone terminal 120 will allow I(B) channel data onto the application module interface transmitter. It is noted that all AMX-B* data will be zeroes until the module 140 sends a set voice channel configuration message, discussed below.

As shown in FIG. 7, when the module 140 detects the PHONE-OK signal during stage 780, the module 140 should reduce its activity message rate to one per 100 milliseconds during stage 790, and the module 140 may send a phone states request, discussed below, to obtain phone state information. Until the PHONE-OK signal is asserted by the telephone terminal 120, only activity messages can be sent and no B or D channel data is allowed onto the application module interface 130.

If the telephone terminal 120 fails to detect the MOD-OK signal during stage 660, and receives an activity message from the module 140 within 500 milliseconds of detecting the module present (MP) signal, the telephone terminal 120 will disable its AMI transceiver and begin the start-up process over again. It is noted that the start-up process should take at most 110 milliseconds, with 30 milliseconds allocated for detecting the module present (MP) signal, 50 milliseconds allocated for detecting five activity messages from the telephone terminal 120 (during which time MOD-OK should be detected), and 30 milliseconds allocated for detecting the PHONE-OK signal.

The module 140 waits up to one second from initialization to detect that the PHONE-OK signal has been asserted by the telephone terminal 120. If the one second time interval expires, the module 140 should reset its AMI transceiver, turn off the MOD-OK signal, and begin the start-up process over again after a delay of at least 30 milliseconds.

Recovery From Errors and Disconnects

Once the AMI connection has been established in accordance with the start-up process, the AMI connection may be disrupted, for example, due to a module 140 losing power, or a transient event that corrupts the data stream and causes a loss of synchronization. A disruption of the AMI connection may be detected using the hardware signals and the control channel protocol. If a disruption is detected, the detecting telephone terminal 120 or module 140 immediately turns off its receiving OK (PHONE-OK or MOD-OK) signal and disables its AMI transceiver. The detecting telephone terminal 120 or module 140 should then wait at least 30 milliseconds before attempting to restart the AMI, during stages 695 or 795, respectively.

According to a feature of the present invention, a number of mechanisms may be utilized to detect the disruption of the AMI connection. A telephone terminal 120 or a module 140 may detect that its counterpart receiving OK (PHONE-OK or MOD-OK) signal has been turned off. In addition, the telephone terminal 120 may detect that the module present (MP) signal has been turned off. A disruption can also be detected if a telephone terminal 120 or a module 140 fails to receive an activity message in a 250 millisecond interval, since control channel activity messages are normally sent every 100 milliseconds once the AMI connection is established. In addition, a disruption can also be detected if a telephone terminal 120 or a module 140 fails to receive an acknowledgement (ACK or NACK), discussed below, for an application message and its retransmission. Finally, a disruption can also be detected if excessive errors are received in the control channel data. In one embodiment, excessive is defined to be ten or more errors in a 100 millisecond interval.

Each telephone terminal 120 and module 140 maintains an error counter and increments the counter when the AMI control channel receiver reports a data error or a parity error, when a NACK is received, and when an unrecognized word is received with the ninth bit set (invalid first word of a message). Every 100 milliseconds each telephone terminal 120 and module 140 checks the error counter and then clears the error counter. It is noted that if the AMI connection is lost, the phone must restore its channel configuration to connect its audio section 220 and HDLC controller 230 (FIG. 2) directly to its line interface unit 210.

The control channel receiver errors are parity errors and data errors. A parity error occurs when the ten bits (nine data bits plus one parity bit) make odd parity instead of even parity. A data error occurs when the control channel receiver detects an error in the non-data bit of the control channel field. It is again noted that the non-data bit is zero in all AMI frames 300 except those that contain the start of a new control channel word. A data error occurs if the non-data bit is one in two or more out of five consecutive frames.

Protocol

As discussed above in conjunction with FIG. 4, the control channel uses nine-bit data words (D0–D8) plus a parity bit (P) for error detection. The control channel protocol exploits the ninth bit to indicate the start of a message. In the illustrative embodiment, messages may be of two types, namely, an application message or a protocol control message. The application messages, discussed further below, come in various lengths and convey information, events and requests. According to a feature of the present invention, each application message must be acknowledged by the recipient, and only one application message may be outstanding (awaiting acknowledgement) at a time. If a second application message is sent before the first application message is acknowledged, the second application message will be ignored. If an error is detected during reception of an application message, the receiving unit should immediately send a negative acknowledgement (NACK) message. An outstanding or in-progress application message is retransmitted in response to a NACK message. If an application message is not acknowledged (ACK or NACK) within 50 milliseconds after the end of message transmission, the application message will be retransmitted. If the retransmission is not acknowledged within 50 milliseconds after the end of the message retransmission, the application module interface 130 is reset.

The protocol control messages, discussed further below, are single word messages used for acknowledgement and link activity. The protocol control messages do not require acknowledgement and thus are not retransmitted.

To cover the situation where an application message is properly received, but the acknowledgement is corrupted, a single-bit sequence number, S, is used in both application messages and acknowledgements. If an application message is received with the wrong sequence number, S, the application message will be acknowledged, but the message content will be ignored. An acknowledgement with the wrong sequence number, S, will be ignored. When a unit receives the first word of an application message that has the wrong sequence number, S, the unit can send the acknowledgement before receiving the entire message, since the body will be ignored anyway. The sending unit will accept an acknowledgement while it is still sending an application message only if it is retransmitting the application message. This would only happen in the following case:

(i) Unit A sends an application message with sequence number, N;

(ii) Unit B receives the application message and sends an ACK with sequence number, Not-N;
(iii) The ACK gets corrupted so that Unit A does not receive a valid ACK;
(iv) Unit A times out (50 milliseconds) and retransmits the application message with sequence number, N;
(v) Unit B receives the first word of the retransmitted application message and recognizes that the sequence number is wrong. Unit B sends another ACK with sequence number, Not-N, and may do so before receiving the rest of the message. Unit B ignores the rest of the message.

This example illustrates the need for sequence numbers. Without sequence numbering, the retransmission (sent in step iv) would be considered a new message by Unit B (when received in step v).

Application messages are acknowledged even if the message is unknown or unsupported. The acknowledgement is protocol level, while the application message content is application level. Unknown and unsupported application messages will be ignored.

The first word of an application message conveys the length of the application message body (i.e., the length of the remainder of the message). The maximum length of the body is 15 words. To ensure that the control channel is operating, periodic activity messages are sent by both the telephone terminal 120 and modules 140. It is again noted that the mechanism for the telephone terminal 120 to detect a module being disconnected or losing power is the hardware signals. Rather, the link activity messages are meant to ensure that the AMI control channel is functioning properly. In the illustrative embodiment, an activity message will be sent every 100 milliseconds. If no activity message is received for 250 milliseconds, then the application module interface 130 will be reset, in which case the telephone terminal 120 will resume a standard non-module configuration for the voice channels and D-channel.

It is noted that in order for the application module interface 130 to be useable for voice and data, the application module interface 130 must be virtually error free. Therefore, strong error detection mechanisms, such as cyclic redundancy checks (CRC), are not required for error detection in the control channel protocol. If a control channel word is received with the ninth bit equal to zero and an application message is not expected, then that word will be ignored. An invalid control channel word with the ninth-bit equal to one is considered to be an error and a negative acknowledgement (NACK) message will be sent.

Protocol Control Messages

FIG. 8 illustrates a set of representative protocol control messages. Protocol control messages are single word messages with the following general format:

| 8 | 7 | 6 | 5 | 4 | 3 | 2 | 1 | 0 |
|---|---|---|---|---|---|---|---|---|
| 1 | 0 | 0 | 1 | 1 | X | X | X | X |

The ninth bit is always a one to indicate the start of a message, and bits four through seven are assigned a binary value of "0011" indicating a protocol control message. Bits zero through 3 identify the specific protocol control message. FIG. 8 illustrates a set of representative protocol control messages. As shown in FIG. 8, a link activity message has a fixed coding of "100110000" and is used to prove that the control channel connection is working and active.

An acknowledgement message is coded as "10011111S", where bit zero (S) is the sequence number bit. An acknowledgement is used to confirm that an application message has been received without error. The acknowledgement contains a single bit sequence number that equals the sequence number of the next expected application message. A negative acknowledgement (NACK) message is coded as "100110011" and indicates that an erroneous message was received. The error could be either a parity error, a data error, or an invalid first message word (including zero length for an application message).

Application Messages

Application messages are variable length messages. The first word of each application message has the following general format:

| 8 | 7 | 6 | 5 | 4 | 3 | 2 | 1 | 0 |
|---|---|---|---|---|---|---|---|---|
| 1 | 1 | 1 | 0 | S | n | n | n | n |

The ninth bit is always a one to indicate the start of a message, and bits five through seven are always set to "110" indicating an application message. Bit four (S) is the sequence number bit. Bits zero through three ("nnnn") indicate the length of the message that follows (i.e., a number between one and 15 indicating the number of words remaining in the message). Thus, the maximum total message length is 16 words, including the first application message header word. The bodies of the various individual application messages are summarized in FIG. 9 for application message from a telephone terminal 120 and in FIG. 10 for application messages from a module 140. Each word of the body has its ninth bit set to zero. The first word of the body identifies the message and may include other information as well. It is noted that when the AMI connection is first established (or after a restart), the first application message sent by either side must have a sequence number, S, equal to zero.

Application Messages from Phone 120

When the HDLC transmitter is unused, the telephone terminal 120 must send its S1-channel layer 3 messages to the module 140 by means of the AMI control channel. It is noted that the S1-channel is a D channel message regarding the B1 channel. The module 140 is responsible for sending the S1-channel transmit message, shown in FIG. 9, to the switch. The first word of the body identifies the application message as an S1-channel message. The rest of the application message body is the actual S1-channel layer 3 message which can be 1 to 6 words.

The phone states message provides the module 140 with information on various telephone states. The phone states message is sent in response to a request from the module 140. The module 140 should request a phone states message after the AMI control channel is first established. The phone states message body contains five words as follows. The first word contains a phone states message identifier. The second word contains the telephone hook states, with the following code format: "0:MPKS:DVww." Bit 7 (M) is set to one if Mute is on. Bit 6 (P) is set to one if the phone's overall hook state is off-hook. Bit 5 (K) is set to one if the handset switch-hook is off-hook. Bit 4 (S) is set to one if the speaker is on. Bit 3 (D) is set to one if the headset mode is active (or a separate headset jack is on). Bit 2 (V) is set to one if the voice path is disabled. Bits 0–1 (w) identify what is currently active if the phone is off-hook (P=1), with ww=00 indicating the handset, ww=01 indicating the speaker, ww=10 indicating the adjunct, ww=11 indicating the headset (if separate headset jack). It is noted that if the phone does not have a separate headset jack (i.e., the handset jack is used), then the handset will be shown as active. Group listen (spokesman) mode is indicated by the speaker being on (S=1), but the handset (or headset) being active (ww). Bits 0–1 should be ignored if the phone is on-hook (P=0). An adjunct is always active when it is on, so the adjunct state is revealed by ww.

The third word of the phone states message contains the line states and local modes, with the following code format: "0:ADSL:0TRF." Bit 7 (A) is set to one for A-law voice or zero for µ-Law. Bit 6 (D) is set to one if the B-channel touch tone administration is set (dialing via B-channel messages versus DTMF). Bit 5 (S) is set to one if the line interface layer 1 state is active or is set to zero if layer 1 is down. Bit 4 (L) is set to one if the line interface loopback is active. Bit 2 (T) is set to one if the test mode is active. Bit 1 (R) is set to one if the select ring mode is active. Bit 0 (F) is set to one if feature (shift . . . ) is active.

The fourth word of the phone states message contains the ringer and handset volumes, with the following code format: "0:0rrr:Jhhh." The ringer volume is specified in bits four through six. The handset volume is specified in bits zero through two. Bit 3(J) is set to one if the phone has a handset jack.

The fifth word of the phone states message contains the speaker and headset volumes, with the following code format: "0:Jddd:Ksss." The headset volume is specified in bits four through six. Bit 7 (J) is set to one if there is an independent headset jack (volume). The speaker volume is specified in bits zero through two. Bit 3 (K) is set to one if the phone 120 has a speaker.

In this manner, changes to modes, states, and settings can be conveyed by separate application messages from the telephone terminal 120. It is noted that some states are controlled by D-channel messages and it is up to the module 140 to notice any such changes.

The line interface state change message, shown in FIG. 9, is sent when layer 1 of the protocol is established or lost (i.e., layer 1 comes up or goes down) or when the loopback state changes. The line interface state change message contains its information in a single word body coded as "0:1111:1S0L." Bit 2 (S) is set to one if the state is layer 1 active. Bit 0 (L) is set to one if the line interface loopback is active (provided layer 1 is up, S=1).

The audio state change message, shown in FIG. 9, is sent by the telephone terminal 120 whenever its audio state changes. It is noted that this does not include changes to Mute, which are conveyed by a local button message, discussed below. The audio state change message includes what changed and the new state of all hook sources and what is now active. It is further noted that the active path may not have changed. For example, hanging up when the speakerphone is active. The audio state change message allows the telephone terminal 120 to request the voice path when the module also uses the B1 voice channel.

The audio state change message has a two word body. The first word identifies the message and the source of the state change, and is coded as "0:1111:0Nww," where bits zero through one (ww) are the source, discussed below, and bit two (N) is the new state (set to one if the source is turning on, or going off-hook, and set to zero if the source is turning off, or going on-hook). The second word is coded as "0:MPKS:DVww," in the same manner as the hook states word of the phone states message, discussed above. For both words, bits zero and one (ww) are coded as follows: 00 equals handset, 01 equals speaker, 10 equals adjunct and 11 equals headset (if there is a separate headset jack). It is noted that if the telephone terminal 120 does not have a separate headset jack (i.e., the handset jack is used), then the handset will be shown as active for the headset mode.

The phone hook state (bit 6, P, in the second word) is the overall hook state of the telephone terminal 120 and does not include the hook state of the module 140 (reported to the phone via the module state change messages, discussed below). For example, if the handset is off hook, and the user turns on the speaker phone (with group listen disabled), the following audio state change message will be sent: "0:1111:0101" and "0:1111:0001." The first word indicates that the speaker has been turned on, and the second word indicates that mute is off, the phone is off-hook, the handset is off-hook, the speaker is on, the voice path is enabled, the headset mode is off and the speaker is active.

In a further example, the user in the first example now hangs up the handset, the following audio state change message will be sent: "0:1111:0000" and "0:0101:0001." The first word indicates that the handset is going on-hook, and the second word indicates that mute is off, the phone is off-hook, the handset is on-hook, the speaker is on, the voice path is enabled, the headset mode is off and the speaker is active. It is noted that if mute had been on before the speaker was turned on, mute will be turned off when voice switches to the speakerphone. This change would be reflected in the audio state change message (Bit 7, M, of word 2).

The local button press message, shown in FIG. 9, is used to notify the module 140 when the user presses buttons, such as mute and volume, that do not generate a D-channel button state change message. It is noted that with the 6400-series telephone sets, the softkey navigation buttons, such as menu and next, always generate a D-channel button state change message, and are thus not considered local buttons. The message has either a one-word or a two-word body. Buttons that have only an on/off state use the one-word body, while buttons that have more information use the two-word body.

The first word of the body identifies the local button press message and the local button that was pressed. The local button press message is coded as "0:1110:bbbb," where bits zero through three (bbbb) identify the button and possibly its on/off state as shown below:

| BINARY VALUE | BUTTON/ BUTTON STATE |
| --- | --- |
| 0000 | Mute button: Mute off |
| 0001 | Mute button: Mute on |
| 0010 | Test button: Test mode off |
| 0011 | Test button: Test mode on |
| 0100 | Feature (Shift . . . ) button: Feature off |
| 0101 | Feature ( . . . ) button: Feature on |
| 0110 | Volume up button; second word identifies which volume and volume setting |
| 0111 | Volume down button; second word identifies which volume and volume setting |
| 1000–1111 | Reserved |

For volume up and down, the second word is coded as "0:00ww:0vvv." Bits four and five (ww) identify what volume was adjusted as follows: 00 equals handset, 01 equals speaker, 10 equals ringer, and 11 equals headset (if there is a separate headset jack with its own volume setting). Bits zero through two (vvv) are the new volume setting (0–7).

It is noted that states of mute, test, ring and feature, and the volume settings may be affected by other events that do not cause local button press messages. It is up to the module 240 to notice such events and options and handle them appropriately.

The dial key messages, shown in FIG. 9, are sent when the phone is set for DTMF touch tones and the user presses or releases a dialpad key. When the phone is set for B-channel dailing, button state change D-channel messages are sent instead. The dial key message uses a single word body coded as "0:110R:kkkk," where bit 4 (R ) is set to zero for key press, or set to one for key release, and bits zero through three (kkkk) identify the key: with 1 to 9 for keys 1 to 9, 10 for key 0, 11 for key *, and 12 for key #.

The softkey label contents message, shown in FIG. 9, is sent only in response to a softkey label query message from the module. The softkey label contents message contains the 5-character softkey label and the button number in a six word application message body. The first word is coded as "0:1001:nnnn," where bits zero through three (nnnn) are the softkey button numbers (1 to 12, or 1 to 15). The remaining five words contain the five characters of the softkey label.

The HDLC control confirmation message, shown in FIG. 9, is sent in response to a set HDLC control message from the module after the phone has switched HDLC routing to the application module interface 130. The HDLC control confirmation message has a two-word body. The first word simply identifies the message with the fixed code of "0:0000:1110." The second word is formatted as "0:Crrr:Lsss." Bit 7 (C ) is set to one to confirm that HDLC has switched from the telephone terminal 120 to the module 140, or is set to zero to indicate that the phone already expected the module 140 to be doing HDLC. If C equals zero, the rest of the bits are ignored. Bit 3 (L) is the layer 2 status, with a value of one indicating link up, and a value of zero indicating link down. If L equals 1, then bits zero through two (sss) and bits four through six (rrr) are the S and R sequence numbers, respectively. The sequence numbers are provided so that the module 140 may attempt to pick up control of layer 2 (HDLC) without having to reset the link.

Application Messages from Module 140

The module 140 sends application messages to the telephone terminal 120 in order to set up configurations of the voice and signaling channels, control various telephone functions or states, and to pass received layer 3 S1-channel messages to the telephone terminal 120. FIG. 10 illustrates the bodies of the various individual application messages sent by the module 140.

The set HDLC control message, shown in FIG. 10, instructs the telephone terminal 120 to let the module 140 handle HDLC and the D-channel link layer. Layer 3 D-channel messages will then be passed over the application module interface 130 control channel in application messages. The set HDLC control message has a single word body with a fixed coding of "0:0000:0101." When the telephone terminal 120 establishes an AMI connection, the phone puts received HDLC data onto the application module interface 130 to the module 140. In other words, the phone connects AMX-D to LIUrx-D. Hence, the module 140 should initialize its HDLC receiver and transmitter upon sending the set HDLC control message. In order to avoid losing D-channel messages, the phone 120 will wait until the HDLC is idle (no messages in progress) before connecting its line interface transmit D-channel (LIUtx-D) to the HDLC coming from the module 140 (AMR-D'). When the switch is made, the phone sends an HDLC control confirmation message, discussed above, to the module 140. It is noted that there may be a glitch in the transmitted HDLC when the switch is made, but the HDLC control confirmation message takes 1.875 milliseconds to transmit, so that at least two valid flags should be sent after any glitch. The module 140 can thus begin transmitting D-channel messages right after receiving the HDLC control confirmation message. This is a one-way transfer of HDLC control. If the module 140 needs HDLC control, the module 140 has no reason to give control back to the telephone terminal 120. The telephone terminal 120 will take control of HDLC again only if the AMI connection is lost or the telephone terminal 120 is reset.

The set voice channel configuration message, shown in FIG. 10, tells the telephone terminal 120 how to configure the digital voice channels. The phone changes voice channel configurations immediately upon receipt of this message. The set voice channel configuration message has a two-word body count. The first word simply identifies the message with the fixed code of "0:0000:1111." The second word is coded as "0:ddvv:Xmmm," and sets the configurations as follows. Bits 4–5 (vv) control the source of the phone's line interface transmit B1 channel "voice" (LIUtx-B1). Bits 6–7 (dd) control the source of the phone's line interface transmit I2 channel "voice" (LIUtx-B2). Bit 3 (X) controls whether voice/data channel information is sent to the module 140 on the application module interface 130 (AMX-B*). If X equals zero, zeroes are sent on all AMX voice channels. If X equals one, then the following connections are made: AMX-B1 is connected to LIUrx-B1 (B1 voice from PBX); AMX-B1' is connected to MAP-out (phone's transmit voice); AMX-B2 is connected to LIUrx-B2 (I2 data from PBX); and AMX-B2' is connected to AMR-B2. Initially, the telephone terminal 120 will connected to the phone's audio section (MAP-in).

Bits 6–7 (dd) choose what the phone sends on the I2-channel to the PBX (LIUtx-B2 source), with a value of 00 indicating all ones, a value of 01 corresponding to the phone audio transmit (MAP-out), a value of 10 corresponding to all ones, and a value of 11 corresponding to I2 channel from the module 140 (AMR-B2'). Bits 4–5 (vv) of the second word choose what the phone sends on the B1-channel to the PBX (LIUtx-B1 source), with a value of 00 indicating all ones, a value of 01 corresponding to the phone audio transmit (MAP-out), a value of 10 corresponding to all ones, and a value of 11 corresponding to the B1 channel from the module 140 (AMR-B1').

Initially, the telephone terminal 120 will connect B1 (LIEtx-B1) to its audio transmit path (MAP-out) and send all ones on I2. Bits 0–2 (mmm) control the digital source of the phone's receive audio section (to handset and speaker). Initially, receive audio is connected to the B1-channel from the PBX (LIUrx-B1). It is noted that these configurations do not control whether any audio output is active. Analog input/output control depends on the phone's audio state machine. The set voice channel configuration message controls only routing of the digital channel.

The following table shows the receive audio source slections:

| BIT 2 | BIT 1 | BIT 0 | RECEIVE AUDIO SOURCE |
|---|---|---|---|
| 0 | 0 | X | QUIET |
| 0 | 1 | 0 | LIUrx-B1 |
| 0 | 1 | 1 | LIUrx-B2 |
| 1 | 0 | 0 | AMR-B1 |
| 1 | 0 | 1 | AMR-B2 |
| 1 | 1 | 0 | AMR-B1' |
| 1 | 1 | 1 | AMR-B2' |

The phone states request message, shown in FIG. 10, instructs the phone to send a phone states message back to the module 140. The request has a single word body with the fixed code "0:0000:0011." A module 140 should send a phone states request message to the telephone terminal 120 after, the AMI connection is established in order to obtain the µ-law/A-law voice encoding setting, plus status of the line interface and any telephone states that may be of interest to the module 140.

The module state change message, shown in FIG. 10, is used to inform the telephone terminal 120 of state changes in the module 140 that may be relevant to the telephone terminal 120, such as a module 140 going off-hook using the B1 voice path. The message has a two word body with the first word using the fixed code "0:0001:1000." The second word identifies the state change and the new state. The second word is coded as "0:0sss:wwww," where bits 4–6 (sss) contain new state information and bits 0–3 (wwww) identify what changed. A wwww value of 0000 indicates that the B1 channel has a hook state change, with bit 4 set to one indicating off-hook and bit 4 set to zero indicating on-hook. A wwww value of 0010 indicates that the S1 channel layer 2 has come up or gone down, with bit 4 set to one indicating link up and bit 4 set to zero indicating link down. A wwww value of 0100 indicates that the S1 channel timeout has occurred. All other wwww values are reserved.

Any of the state bits (sss) that are unused by a given type of change (wwww) are set to zero. If the module 140 can affect the hook state, it must report its hook state changes to the telephone terminal 120 via a module state change message.

When the telephone terminal 120 is not using its HDLC controller, the module 140 must pass to the phone all layer 3 S1-channel messages received from the switch. The format of this message mirrors the S1-channel transmit message sent by the phone 120 to the module 140, as discussed above. The first word of the body identifies the application message as an S1-channel message and is coded as "0:0000:0000." The rest of the application message body is the actual S1-channel layer 3 message which can be 1 to 14 words.

The output local tone message, shown in FIG. 10, allows the module 140 to activate one of the non-ringer sounds on the telephone terminal 120, such as error beep, confirmation tone, or button click. The output local tone message is coded as a single word body as "0:1010:00TT," where TT is equal to 00 for a button click, 01 for error beep or 10 for confirmation tone. TT equal to 11 is reserved and will be ignored by telephone terminals 120 that do not support a fourth tone.

The telephone control message, shown in FIG. 10, is used by the module 140 to turn the phone's speaker on or off, turn mute on or off, control volume settings, and other feature controls. The telephone control message has a two-word body with the first word using a fixed code of "0:0000:1010" and the second word identifying what to control, The second word has a format of "0:0xxx:wwww." our to six (xxx) are the new setting, the meaning of which depends upon bits zero to three (wwww) which determine what to control, as follows:

| BINARY VALUE | BUTTON/ BUTTON STATE |
| --- | --- |
| 0000 | Speaker On/Off: Bit 4 is set to one to turn on, and is set to zero to turn off. |
| 0001 | Mute On/Off: Bit 4 is set to one to turn on, and is set to zero to turn off. |

-continued

| BINARY VALUE | BUTTON/ BUTTON STATE |
| --- | --- |
| 0010 | Adjunct TO signal On/Off: Bit 4 is set to one to turn on, and is set to zero to turn off (if phone supports adjunct). |
| 0011 | Test Mode On/Off: Test Bit 4 is set to one to turn on, and is set to zero to turn off |
| 0100 | Feature (Shift) On/Off: Bit 4 is set to one to turn on, and is set to zero to turn off |
| 0101–0111 | Reserved |
| 1000 | Set Handset Volume: Bits 4–6 are the new volume setting |
| 1001 | Set Speaker Volume: Bits 4–6 are the new volume setting |
| 1010 | Set Ringer Volume: Bits 4–6 are the new volume setting |
| 1011 | Set Headset Volume: Bits 4–6 are the new volume setting (if phone has separate headset jack) |
| 1100–1111 | Reserved |

Turning the speaker on or off may cause the phone to generate an audio state message.

The generate recorder beep message, shown in FIG. 10, allows a recorder interface module to use the phone's T7951 single tone generator to inject a recorder warning beep into the transmit audio path. This adds the beep into both transmit voice and voice sidetone. Each message results in a single beep. Thus, the mudule controls the interval between beeps by how often the module 140 sends a generate recorder beep message. The message is ignored if the phone is off-hook.

The generate recorder beep message has a four word body, with the following format. The first word has a fixed code of "0:0001100." The second word contains the T7951 single tone frequency code in bits zero through four (0:000f:ffff). The third word contains the T7951 single tone amplitude code in bits zero through six (0:1aaa:aaaa). The fourth word is the beep duration as a multiple of 10 milliseconds (0:dddd:dddd). Thus, a duration of 10 milliseconds to 2550 milliseconds is supported. It is noted that the actual beep duration could be up to 10 milliseconds less than that requested due to timing uncertainties in the phone 120. A duration of zero is invalid and will be ignored.

The softkey label query message, shown in FIG. 10, allows the module 140 (or associated application) to obtain the text of one of the phone's softkey labels. The softkey label query message has a two-word body. The first word is the fixed code "0:0000:1001," and the second word contains the softkey button number in bits zero through three: "0:0000:nnnn." The message will be ignored by the phone if the phone does not support softkeys or the softkey number is out of range (usually supporting values of 1 to 12 or 1 to 15). When querying for all softkey labels, the module 140 should wait for a softkey label contents message, discussed above, back from the telephone terminal 120 before sending the next softkey label query message (due to memory limitations in the phone).

TELEPHONE TERMINAL SIGNALING AND BEARER CHANNEL CONFIGURATIONS

Signaling Channel

The signaling channel, D, supports two modes of operation. In a first mode, referred to as the "normal telephony mode," the telephone terminal 120 operates as if there is no module 140 attached. In the normal telephony mode, D-channels are terminated in the telephone terminal 120 via the HDLC controller 230 in the integrated digital telephone chip 200 (FIG. 2). The normal telephony mode is used when there is no module 140 attached, or the attached module 140 is not powered, deactivated or faulty. However, if the telephone terminal 120 detects that a module 140 is attached, the telephone terminal 120 will periodically attempt to establish communication while operating normally from a user's point of view.

A second mode, referred to as the "module mode," is entered after a successful AMI connection start-up and the module 140 sets HDLC control, as discussed above. The telephone terminal 120 disables the D-channel HDLC controller 230 in the integrated digital telephone chip 200 and sends and receives level 3 D-channel messages via the AMI control channel. The telephone terminal 120 has also routed the D-channels to and from the PBX 110 via the AMI connection to the attached module 140. The module 140 terminates the D-channel with its own HDLC controller 230. D-channel messages to and from the telephone terminal 120 are sent over the AMI control channel. This terminate and regenerate operation is similar to the legacy equipment, such as the Definity™ linked data modules. This operation also affords the module 140 more control of the telephone terminal 120.

Bearer Channels

FIG. 11 summarizes the voice/bearer, B1 and B2, channel configurations. (Telephone) voice paths refer to the routing of data to and from the main audio processor 220 of the integrated digital telephone chip 200. In addition, the term "base" refers to the telephone terminal 120. "LIU" indicates the line interface unit 210 of the integrated digital telephone chip 200 which terminates the bearer channels (B1 and B2) to and from the PBX 110.

MODULE IMPLEMENTATIONS

Figure 12:
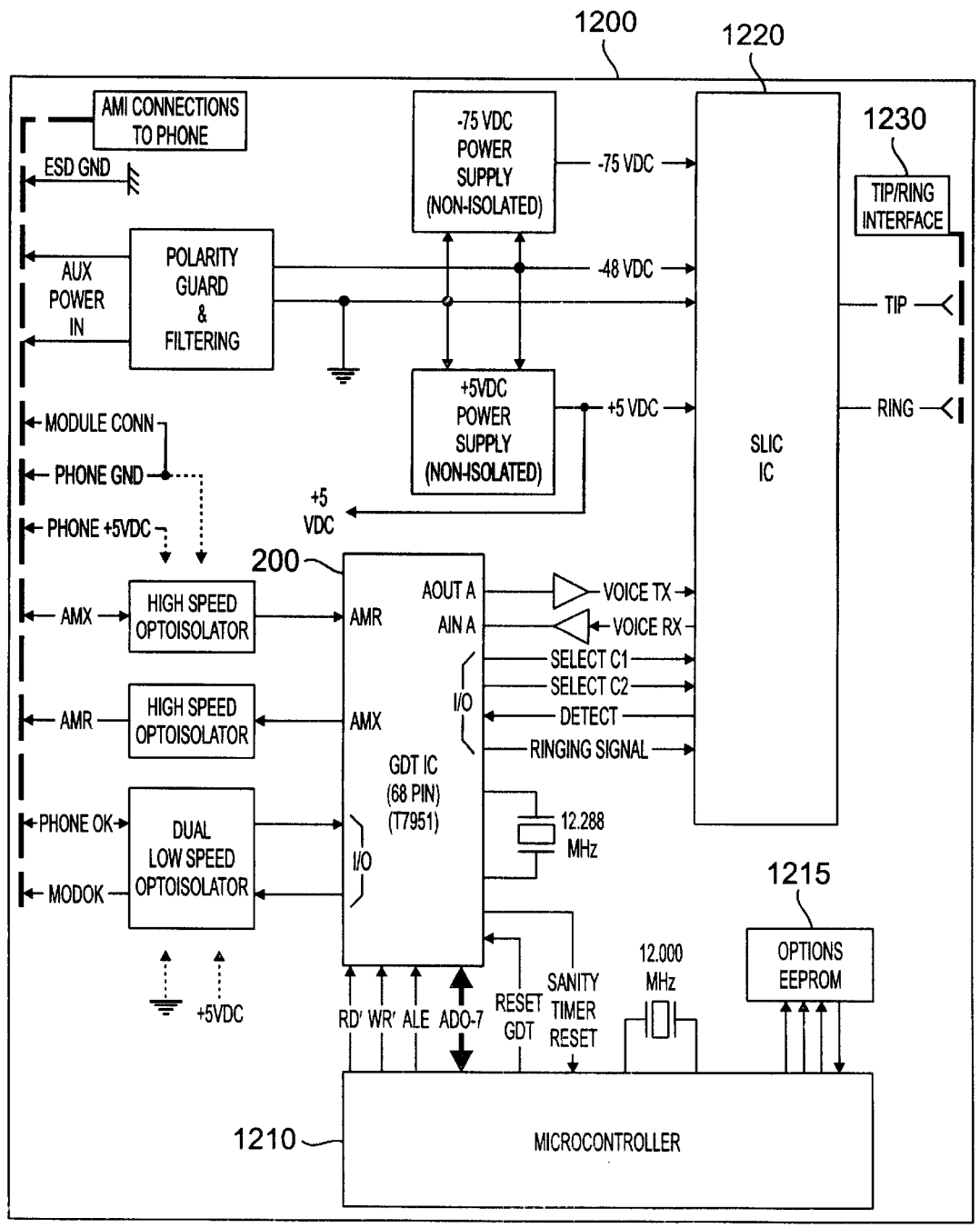
FIG. 12 illustrates a schematic block diagram of a tip/ring module that allows an analog device to be connected to the digital PBX of FIG. 1.

FIG. 12 illustrates a schematic block diagram of a tip/ring module 1200 that allows an analog device, such as a facsimile machine or modem, to be connected to the digital PBX environment 110. As shown in FIG. 12, the tip/ring module 1200 includes a microcontroller 1210 that controls signaling between the attached telephone terminal 120 and PBX 110. The microcontroller 1210 also controls the Tip/Ring interface 1230. An EEPROM (Electrically Erasable. Programmable Read Only Memory) IC 1215 is used for non-volatile options storage, such as ring rates and levels. The Subscriber Line Interface Controller (SLIC) IC 1220 is a commercially available interface to the attached user-provided telephony/communications equipment on a tip/ring interface 1230, such as a modular-type RJ-11-type analog type interface.

Figure 13:
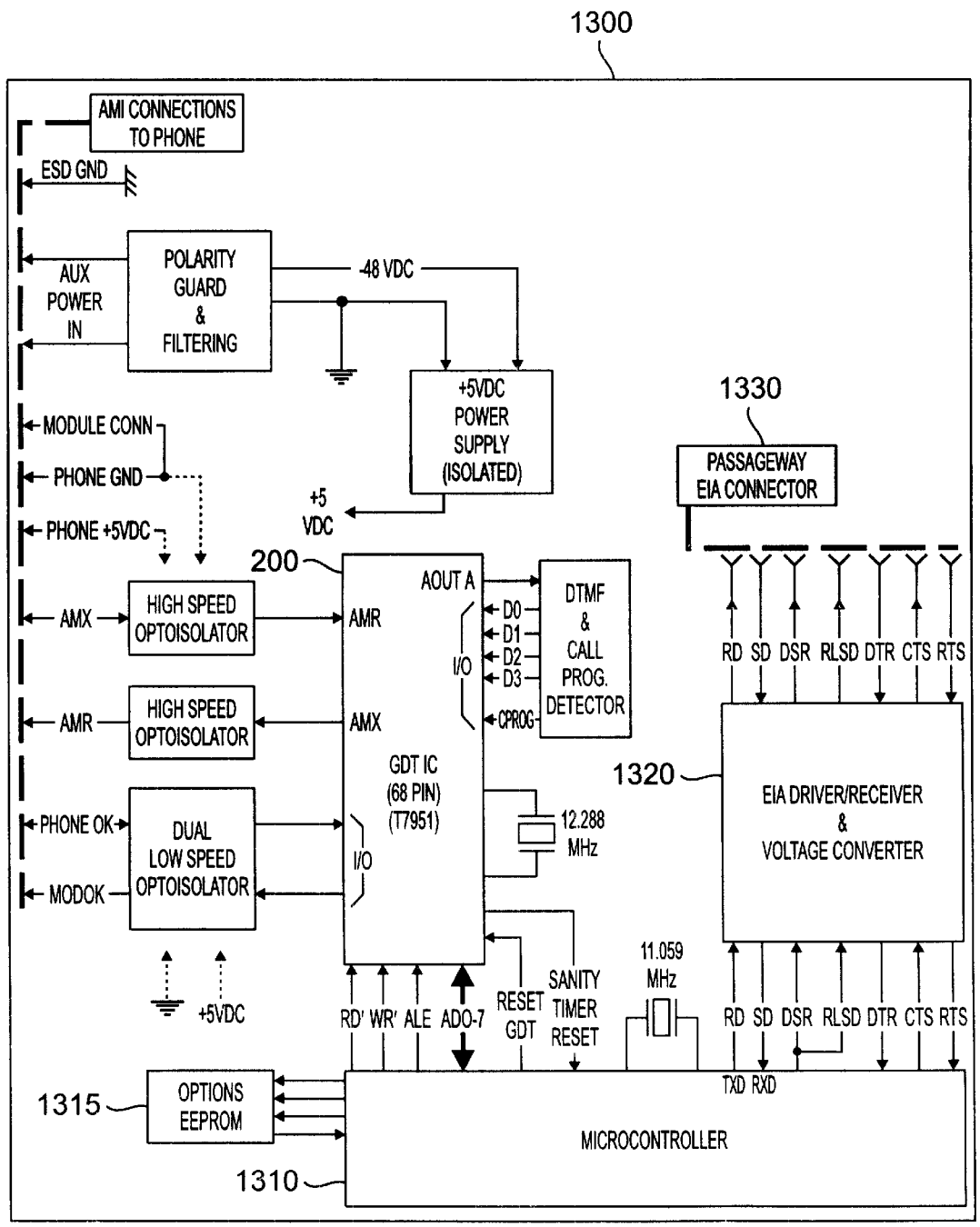
FIG. 13 illustrates a schematic block diagram of an RS-232 (passageway) module that allows a computer or workstation to be connected to the digital PBX of FIG. 1.

FIG. 13 illustrates a schematic block diagram of an RS-232 (passageway) module 1300 that allows a computer or workstation to be connected to the digital PBX. environment 110. As shown in FIG. 13, the RS-232 (passageway) module 1300 includes a microcontroller 1310 that controls signaling between the attached telephone terminal 120 and the PBX 110. The microcontroller 1310 also controls the information to the attached personal computer (not shown) connected to connector 1330, discussed below, which is used for a Computer Telephony Interface (CTI) function. An EEPROM (Electrically Erasable Programmable Read Only Memory) IC 1315 is used for non-volatile options storage, such as ring rates and levels. A commercial EIA Driver/Receiver device 1320 converts the serial data and control levels to and from the microcontroller 1310 to EIA-232 levels for connection to a personal computer (not shown). The connector 1330 may be embodied as a standard EIA connector to physically connect the module to a personal computer via an EIA cable.

Figure 14:
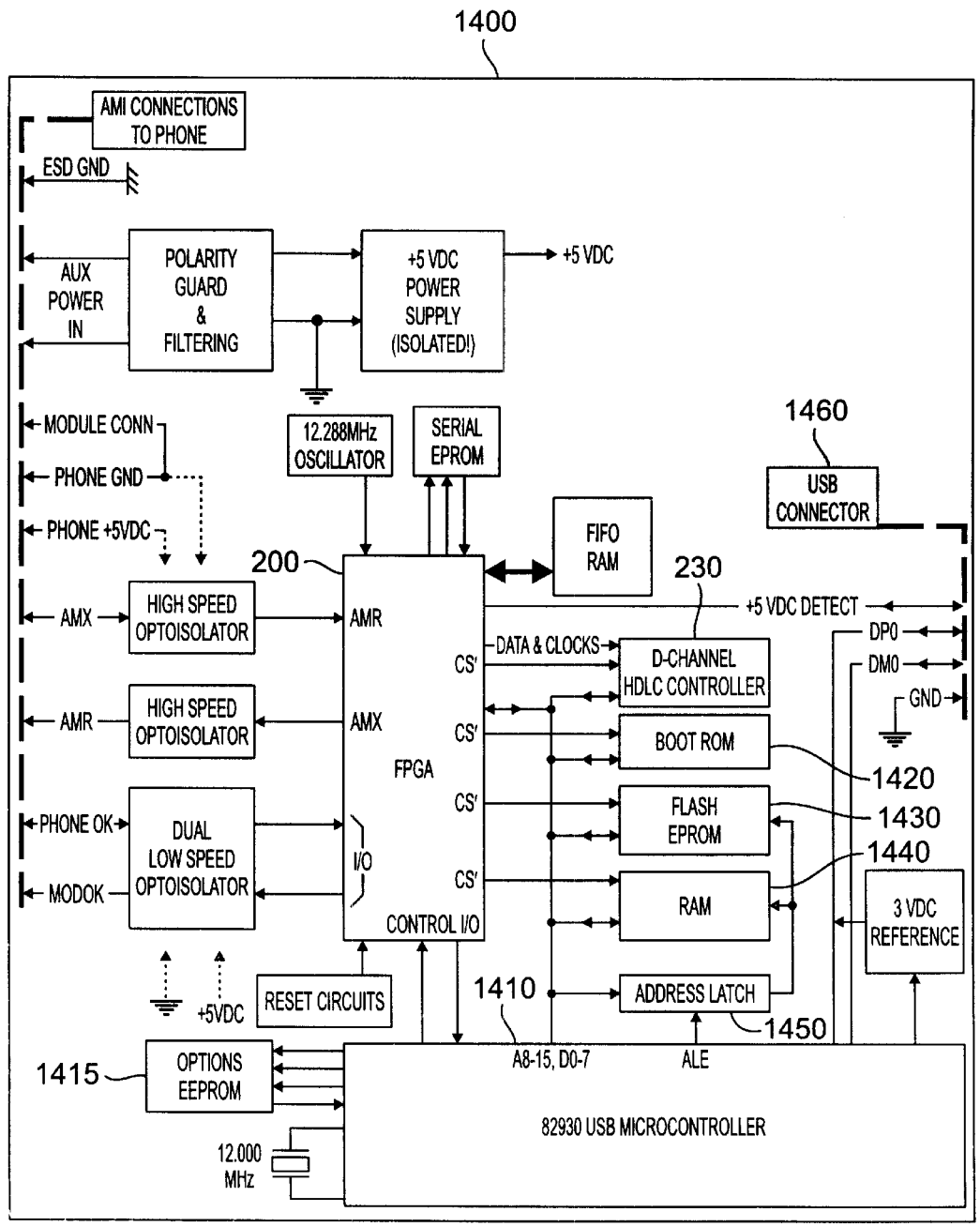
FIG. 14 illustrates a schematic block diagram of a Universal Serial Bus (USB) module that allows a USB-enabled computer, workstation or other device to be connected to the digital PBX of FIG. 1.

FIG. 14 illustrates a schematic block diagram of a Universal Serial Bus (USB) module 1400 that allows a USB-enabled computer, workstation or other device to be connected to the digital PBX environment 110. As shown in FIG. 14, the integrated digital telephone chip 200 may be embodied as a custom Gate array that interfaces the AMI from the digital telephone terminal 120 to the USB module. The HDLC controller 230 terminates the HDLC D-Channel to/from the PBX 110 attached to the digital telephone terminal telephone terminal 120. The microcontroller 1410 may be embodied as a commercially available USB microcontroller that controls the signaling between the PBX, attached telephone terminal 120 and optionally a control device attached to the USB interface 1460. An EEPROM (Electrically Erasable Programmable Read Only Memory) IC 1415 is used for non-volatile options storage, such as ring rates and levels. A small read only memory (ROM) IC 1420 is used for starting up the microcontroller 1410 and for re-programming purposes. A re-programmable memory device 1430 permits changes in the functionality of the microcontroller 1410, via the USB interface 1460, thereby permitting software upgrades to the module. A random access memory IC 1440 is used for proper microcontroller operation 1410. A latch 1450 is used to de-multiplex the address/data from the microcontroller 1410. A USB connector 1460 may be embodied as an industry standard device for downstream device connections to a USB hub.

It is to be understood that the embodiments and variations shown and described herein are merely illustrative of the principles of this invention and that various modifications may be implemented by those skilled in the art without departing from the scope and spirit of the invention.

We claim:

1. An interface for accessing digital channels in a private branch exchange (PBX) environment, comprising:

a connector for connecting said interface to an application module and a telephone terminal; and a receiver for receiving hardware control signals from said connector, said hardware control signals including a first signal indicating that said application module is connected to said interface, a second signal indicating that said telephone terminal is receiving valid control channel messages and a third signal indicating that said application module is receiving valid control channel messages, wherein said hardware control signals permit the disruption of a connection between said telephone terminal and said application module to be detected.

2. A method for initiating a connection between an application module and a telephone terminal connected by means of an interface in a private branch exchange (PBX) environment, said method comprising the steps of:

detecting whether a signal indicating that an application module is present is active;

transmitting at least one control channel activity message;

synchronizing to a sequence of bits transmitted by said application module;

detecting a signal transmitted by said application module to indicate that said application module is receiving valid control channel messages;

enabling a receiver;

detecting a link activity message from the application module;

activating a signal that indicates that said telephone terminal is receiving valid control channel messages; and commencing normal message activity.

3. The method of claim 2, further comprising the step of placing received D channel HDLC data onto a transmitter (AMX).

4. The method of claim 2, further comprising the step of allowing B channel data onto a transmitter (AMX).

5. The method of claim 2, further comprising the steps of disabling said transmitter and receiver and restarting said method again if the telephone terminal fails to detect the MOD-OK signal and fails to receive an activity message from the application module within a predefined time period.

6. The method of claim 2, further comprising the steps of disabling said transmitter and receiver, waiting for a predefined interval and restarting said method again if a disruption of said normal message activity is detected.

7. A method for initiating a connection between an application module and a telephone terminal connected by means of an interface in a private branch exchange (PBX) environment, said method comprising the steps of:

detecting the receipt of a control channel activity message from a telephone terminal;

activating a signal to indicate that said application module is receiving valid control channel messages;

enabling a transmitter;

sending at least one link activity message after a waiting condition has occurred;

detecting a signal transmitted by said telephone terminal to indicate that said telephone terminal is receiving valid control channel messages; and commencing normal message activity.

8. The method of claim 7, further comprising the steps of disabling said transmitter and receiver, deactivating said module receiving ok (MOD-OK) signal and restarting said method again if said phone receiving OK (PHONE-OK) signal is not detected within a predefined interval.

9. The method of claim 7, further comprising the steps of disabling said transmitter and receiver, waiting for a predefined interval and restarting said method again if a disruption of said normal message activity is detected.

10. The method of claim 7, wherein said predefined waiting condition consists of waiting for a predefined number of link activity messages from the telephone terminal.

* * * * *